United States Patent [19]
Omura et al.

[11] Patent Number: 4,993,266
[45] Date of Patent: Feb. 19, 1991

[54] SEMICONDUCTOR PRESSURE TRANSDUCER

[75] Inventors: Yoshiteru Omura; Kouji Tsukada; Masaharu Takeuchi; Sadayuki Hayashi; Sanae Tokumitsu, all of Aichi, Japan

[73] Assignee: Kabushiki Kaisha Toyota Chuo Kenkyusho, Aichi, Japan

[21] Appl. No.: 384,817

[22] Filed: Jul. 25, 1989

[30] Foreign Application Priority Data

| Jul. 26, 1988 | [JP] | Japan | 63-186329 |
| Jul. 26, 1988 | [JP] | Japan | 63-186330 |
| Jul. 26, 1988 | [JP] | Japan | 63-186331 |
| Jul. 26, 1988 | [JP] | Japan | 63-186332 |
| Jul. 26, 1988 | [JP] | Japan | 63-186333 |
| Jul. 26, 1988 | [JP] | Japan | 63-98933[U] |
| Jul. 26, 1988 | [JP] | Japan | 63-98934[U] |

[51] Int. Cl.$^5$ .................................... G01L 9/04
[52] U.S. Cl. .............................. 73/720; 73/754; 73/DIG. 4
[58] Field of Search ............... 73/720, 721, 726, 727, 73/DIG. 4, 723, 862.68; 330/4, 42

[56] References Cited

U.S. PATENT DOCUMENTS

| 3,149,488 | 9/1964 | Castro | 73/862.68 |
| 4,833,929 | 5/1989 | Omura et al. | 73/862.68 |

OTHER PUBLICATIONS

Journal of Applied Physics, vol. 32, No. 10, Oct. 1961, W. G. Pfann, et al; Semiconducting Stress Transducers Utilizing the Transverse and Shear Piezoresistance Effects.

*Primary Examiner*—Donald O. Woodiel
*Attorney, Agent, or Firm*—Oblon, Spivak, McClelland, Maier & Neustadt

[57] ABSTRACT

A semiconductor pressure transducer for detecting a pressure applied to a diaphragm. The pressure transducer comprises a diaphragm and a pressure detector including an Si single crystal which is so formed as to have a crystal face of {110} as the surface to which a compression force is applied, and which is attached to the pressure detector such that the crystal face is parallel to the diaphragm, a first pair of opposing electrodes provided on the Si single crystal in the direction having an angle of 45 degrees with the direction of <001> on the crystal face of {110} and a second pair of opposing electrodes provided on the Si single crystal in the direction having an angle of 45 degrees with the direction of <110> of the Si single crystal, either of the first or second pair of electrodes serving as output electrodes and the other pair serving as input electrodes and composite seat with one end thereof bonded to the crystal face of {110} of the Si single crystal so as to transmit the pressure applied to the diaphragm perpendicularly to the crystal face of the Si single crystal as a compression force. The pressure applied to the diaphragm acts perpendicularly to the crystal face of the Si single crystal as a compression force and the output electrodes output a voltage corresponding to the compression force.

22 Claims, 16 Drawing Sheets

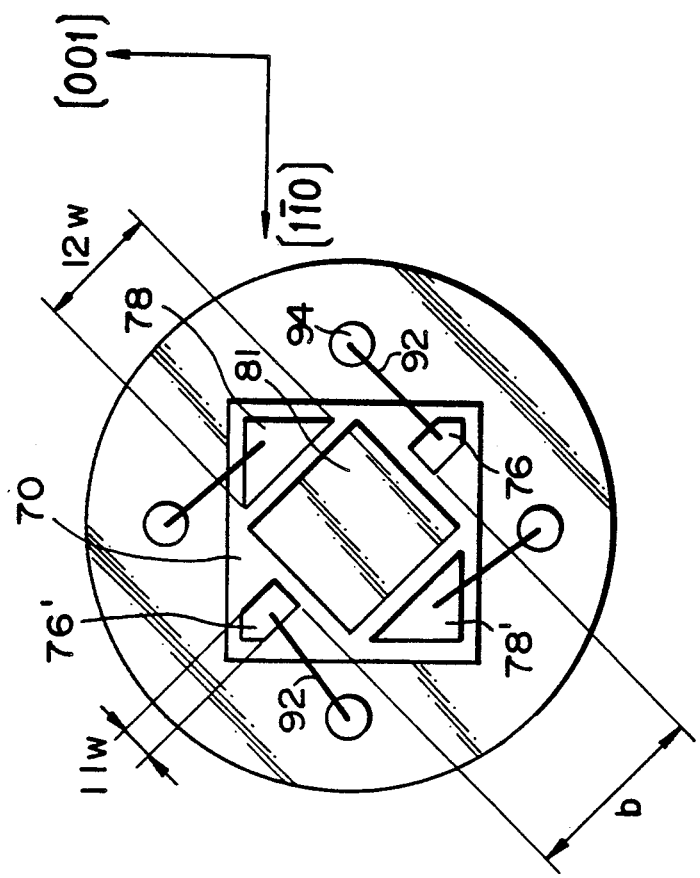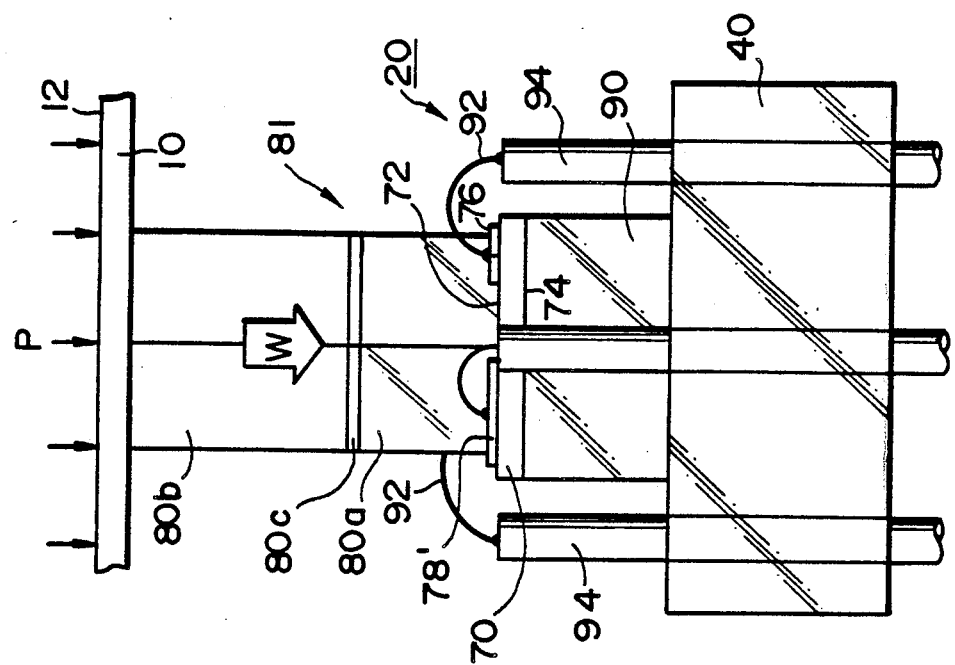

SEMICONDUCTOR PRESSURE TRANSDUCER

BACKGROUND OF THE INVENTION

The present invention relates to a semiconductor pressure transducer and, more particularly, to a semiconductor pressure transducer for converting the pressure applied to a diaphragm into an electric signal and outputting the electric signal corresponding to the pressure.

DESCRIPTION OF THE RELATED ART

A semiconductor pressure transducer is widely used in various fields as a sensor for detecting pressure. Such a pressure transducer is required to have a capability of accurately measuring pressure without being influenced by the ambience.

Especially, a semiconductor pressure transducer is often used under a severe circumstance. For example, some semiconductor pressure transducers have recently been used for measuring the pressure of a combustion gas in the cylinder of an internal combustion engine. A semiconductor pressure transducer used under such a severe circumstance is naturally required to measure the compression force applied thereto with good responsiveness and high reliability without being influenced by magnetic and electric noise in the ambience.

As such a pressure transducer, a strain-gauge transducer and a piezoelectric transducer are conventionally known.

Strain-gauge transducer

FIG. 2 shows an example of a conventional strain-gauge transducer. This pressure transducer is composed of a diaphragm 10 provided with a cylindrical supporting portion 10a which is secured to a supporting plate 40, and a pressure detector 20 for detecting the pressure P applied to the surface 12 of the diaphragm 10.

The pressure detector 20 includes a square pillar-shaped strain generator 30 which is erected on the supporting plate 40 such that the upper end thereof is in contact with the center of the back surface of the diaphragm 10 and a semiconductor strain gauge 34 pasted on each side surface of the strain generator 30 by an adhesive 32. The pressure P applied to the diaphragm 10 is transmitted to the strain generator 30 in the form of the compression force W ($W \approx \pi \cdot r^2 \cdot P \cdot k1$, wherein k1 represents the conversion efficiency of the diaphragm 10). The strain produced on the strain generator 30 on the basis of the compression force W is detected by each strain gauge 34, and the voltage signal output from each strain gauge 34 is output through lead wires 36.

Such a conventional strain-gauge pressure transducer has the following problems.

In this type of pressure transducer, the semiconductor strain gauge 34 is pasted on each side surface of the strain generator 30 by an adhesive in order to reduce the deleterious influence of the resistance of the semiconductor strain gauge which is varied with change of temperature on the detection characteristic, and these plurality of semiconductor strain gauges are connected with each other in such a manner as to constitute a Wheatstone bridge circuit. The manufacturing process of the pressure transducer has therefore become complicated and, hence, the pressure transducer produced is expensive.

In addition, since a conventional transducer is provided with the strain gauges 34 pasted on the side surfaces of the strain generator 30 by the adhesive 32, the deleterious influence of the adhesive 32 such as creep and hysteresis is inevitable. A high technique is required for pasting the strain gauges 34 by the adhesive 32 and the variation of the characteristics of the strain gauges 34 depending on the adhesive is disadvantageously large.

Piezoelectric pressure transducer

FIG. 3 shows an example of a conventional piezoelectric pressure transducer. This pressure transducer is provided with the pressure detector 20 so designed that the pressure P applied to the diaphragm 10 acts on a piezoelectric element 60 mounted on the supporting plate 40 as the compression force W through a transmitting means 50. The piezoelectric element 60 is so constituted as to output the voltage corresponding to the pressure P from electrodes 62 provided on both sides of the piezoelectric element 60 through lead wires 64.

Although such a conventional piezoelectric pressure transducer is advantageous in that it is possible to provide a large output voltage corresponding to the pressure P, since the resistivity of the piezoelectric element 60 itself is high, noise is apt to mix with the output voltage and the output voltage is disadvantageously lowered with the elapse of time.

As a countermeasure, a charge amplifier is used for effecting an impedance conversion in the vicinity of the piezoelectric element 60, thereby leading the voltage to the outside. However, the charge amplifier is too expensive to be used together with the pressure transducer and this measure cannot be said the essential solution of the above-described problems.

In addition, since both conventional strain-gauge and piezoelectric pressure transducers are unsatisfactory in heat resistance at high temperatures, they are unsuitable for measuring the pressure of high-temperature and high-pressure fluid.

That is, the strain-gauge pressure transducer has a problem in the heat resistance of the adhesive 32 at a high temperature, while the piezoelectric pressure transducer has a problem in reliability of the dielectic constant of the piezoelectric element 60 which greatly varies with change of temperature.

SUMMARY OF THE INVENTION

Accordingly, it is an object of the present invention to eliminate the above-described problems in the related art and to provide a pressure transducer having high reliability at a low cost.

To achieve this aim, the present invention provides a pressure transducer comprising:

a diaphragm; and a pressure detector;

the pressure detector including:

an Si single crystal which is so formed as to have a crystal face of {110} as the surface to which a compression force is applied, and which is attached to the pressure detector such that the crystal face is parallel to the diaphragm;

a plurality of electrodes which consist of a first pair of opposing electrodes provided on the Si single crystal in the direction having an angle of 45 degrees with the direction of <001> on the crystal face of {110} and a second pair of opposing electrodes provided on the Si single crystal in the direction having an angle of 45 degrees with the direction of <110> of the Si single crystal, either of the first or second pair of electrodes serving as output electrodes and the other pair serving as input electrodes;

a composite seat with one end portion and the other end portion being made of different materials from each other, the one end portion being bonded to the crystal face of {110} of the Si single crystal and the other end portion being in contact with the diaphragm so as to transmit the pressure applied to the diaphragm perpendicularly to the crystal face of the Si single crystal as a compression force; and a support base which is bonded to the opposite surface of the Si single crystal relative to the surface to which the seat is bonded and which supports the Si single crystal;

the pressure transducer converting the pressure applied to the diaphragm into a compression force which acts perpendicularly to the crystal face of the Si single crystal and outputting the voltage corresponding to the compression force from the output electrodes.

Points Aimed at

The points aimed at for solving the above-described problems and achieving a pressure transducer according to the present invention will be described.

Conventionally, a Wheatstone bridge circuit is constituted by a plurality of semiconductor strain gauges in order to reduce the deleterious influence of a change in the resistance caused by a change in the temperature of the semiconductor strain gauges on the characteristics.

First point

The first point aimed at in the present invention is to constitute a plurality of strain gauges by one Si single crystal in place of the Wheatstone bridge circuit constituted by such a plurality of semiconductor strain gauges in the related art. For this purpose, a pair of opposing output electrodes and a pair of opposing input electrodes are provided on one Si single crystal in such a manner as to intersect each other, preferably such as to be orthogonal to each other.

Such a structure can solve one of the above-described problems in the related art by reducing the deleterious influence of a temperature change on the characteristics for the reasons which will be described later.

Second point

Even the use of one Si single crystal provided with a pair of output electrodes and a pair of input electrodes intersecting each other, however, leaves the other problems unsolved so long as the Si single crystal is pasted to the side surface of the strain generator by an adhesive as in the related art.

The second point aimed at by the present invention is to adopt a novel system for detecting pressure in which a compression force is applied perpendicularly to the crystal face of the Si single crystal and the compression force is detected by utilizing the piezoresistive effect of the Si single crystal based on the compression force.

A conventional pressure transducer is provided with a plurality of strain gauges pasted to the side surfaces of a a strain generator by an adhesive, and detects a compression force as the compression strain of the strain generator. The compression strain of the strain gauge is therefore transmitted to each strain gauge through the adhesive, so that the transducer is susceptible to deleterious influence of the adhesive such as creep and hysteresis, thereby lowering the reliability.

In contrast, according to the present invention, a quite novel structure is adopted in which one crystal surface of an Si single crystal is bonded to a seat and the other to a support base, and a compression force is applied perpendicularly to the crystal face of the Si single crystal.

Owing to this structure, even if an adhesive is used for bonding the Si single crystal with the seat and the support base, deleterious influence of the adhesive such as creep and hysteresis is greatly reduced, thereby greatly enhancing the reliability of the measured data. In order to safely remove such influence of the adhesive, the Si single crystal is preferably bonded with the seat and the support base not by an adhesive but by electrostatic bonding which is disclosed in, for example, Japanese Patent Publication No. 28747/1978.

Third point

When a compression force is measured by using such an Si single crystal, it is necessary that the Si single crystal outputs the measured voltage which corresponds to the compression force applied thereto.

In view of this, the present inventors investigated the crystal surface of an Si single crystal which provides a large piezoresistive coefficient $\pi_{63}'$. As a result, it has been found that it is necessary to form an Si single crystal so as to have a crystal face of {110} as the surface to which a compression force is applied.

Fourth point

As well known, the efficiency of an Si single crystal is greatly reduced when it is used under a high-temperature circumstance. The degree of reduction is different depending upon the source and the density of the impurity of the Si single crystal. For example, in the case of a p-type Si single crystal with boron added and having an impurity density of $10^{16}/cm^3$, the resistance gradually rises in a temperature range between the vicinity of room temperature and about 250° C. without a sudden change, but when the temperature has reached to 250° C., the resistance rapidly decreases. Accordingly, a semiconductor pressure transducer using such an Si single crystal cannot be used under a high-temperature circumstance as it is.

In view of this, the present inventors studied a measure for preventing the conduction of heat from the diaphragm to which the pressure P is applied to the Si single crystal in case of use under a high-temperature circumstance.

As a result of the studies, this problem has been solved by forming the seat for transmitting a compression force from the diaphragm to the Si single crystal as a composite seat by combining at least two kinds of materials.

To state this concretely, since one end of the seat is bonded to the Si single crystal, it is preferable to form the seat from a material having a thermal expansion coefficient approximate to that of the Si single crystal. On the other hand, since the other end of the seat is in contact with the diaphragm, it is preferable to form this portion from a material excellent in mechanical strength and thermal insulation property. For this reason, the present inventors have formed the portion of the seat which is to be bonded to the Si single crystal from an electrically insulating material having a thermal expansion coefficient approximate to that of the Si single crystal, and the portion of the seat which is to be brought into contact with the diaphragm from a material having a more excellent mechanical strength or thermal insulation property than the material used for the portion which is bonded to the Si single crystal.

If the seat itself is formed as a composite seat consisting of a combination of two kinds of materials, as described above, when the pressure of high-temperature and high-pressure fluid such as combustion gas in the cylinder of an internal combustion engine is measured, the heat transmitted to the diaphragm is alleviated by the seat and does not act on the Si single crystal as a high temperature. The Si single crystal is therefore capable of outputting the voltage corresponding to the pressure P applied to the diaphragm without being influenced by the ambient temperature. At the portion at which the seat comes into contact with the diaphragm, a compression force sometimes locally acts on the diaphragm due to local contact in accordance with the state of the bonded area. In this case, the seat is sometimes plastically deformed or broken. However, by using the material having excellent mechanical strength for this portion, as described above, the seat is not broken due to the local contact of the portion of the seat bonded to the diaphragm, thereby enabling accurate measurement of the pressure P.

In the above explanation, the seat itself is formed from a composite material. Alternatively, it is possible, for example, to provide a pressure transmitting portion formed of a material having an excellent thermal insulation property or an excellent mechanical strength at the portion of the diaphragm which is to be brought into contact with the seat. This structure also enables the stable measurement of the pressure of high-temperature and high-pressure fluid.

Operation of the present invention will now be explained.

FIG. 1 shows a semiconductor pressure transducer according to the present invention.

The pressure transducer is composed of a cylindrical diaphragm 10 having a radius of r secured to a supporting plate 40, and a pressure detector 20 which is secured to the supporting plate 40 for detecting the pressure P applied to the surface 12 of the diaphragm 10 and converting the pressure P into an electric signal.

When such a pressure transducer is used for measuring the pressure P of high-temperature and high-pressure fluid, the surface 12 of the diaphragm 10 is ordinarily exposed to the fluid. It is therefore preferable that the supporting plate 40 is formed from a thermally and electrically insulating material so as to prevent the heat transmitted from the high-temperature and high-pressure fluid to the diaphragm 10 from being transmitted to the pressure detector 20 through the supporting plate 40.

FIG. 4 shows an example of the concrete structure of the pressure detector 20. The pressure detector 20 includes an Si single crystal 70 so formed as to have a crystal face 72 of (110) as the surface to which a compression force is applied, a seat 80 bonded to the crystal face 72 of (110) of the Si single crystal 70 and transmitting the pressure P applied to the diaphragm 10 perpendicularly to the crystal face 72 as the compression force W, and a support base 90 bonded to the other crystal face 74 of the Si single crystal 70 and supporting the Si single crystal 70.

As shown in FIG. 1, the support base 90 of the pressure detector 20 is secured to the supporting plate 40, and the seat 80 is in contact with the central portion 14 of the back surface of the diaphragm 10.

The seat 80 and the support base 90 are preferably electrically insulated from the Si single crystal 70 and are preferably formed from a material having a thermal expansion coefficient approximate to that of the Si single crystal 70. The seat 80 and the support base 90 are preferably bonded to the Si single crystal 70 without using an adhesive. For example, an electrostatic bonding method or a direct bonding method disclosed in Japanese Patent Publication No. 17869/1964 may be adopted.

The Si single crystal 70 is provided with a first pair of opposing electrodes 76, 76' in the direction having an angle of 45 degrees with the direction of [001] and a second pair of opposing electrodes 78, 78' in the direction having an angle of 45 degrees with the direction of [1$\bar{1}$0]. Either of the first or second pair of electrodes are used as output electrodes and the other pair as input electrodes.

When the pressure P of fluid applied to the surface 12 of the diaphragm 10 is measured by using the semiconductor transducer, the pressure P is applied perpendicularly to the seat 80 as the compression force W ($W = \pi \cdot r^2 \cdot P \cdot k1$). The compression force W is uniformly dispersed by the seat 80 and acts perpendicularly to the crystal face 72 of the Si single crystal 70 as a compression stress $$\sigma_Z = W/A$$

wherein A represents the area of the bonded surface of the seat 80 with the Si single crystal 70. If a current I is applied to the Si single crystal 70 from the input electrodes 78, 78', the Si single crystal 70 to which the compression stress $\sigma_Z$ is applied outputs from the output electrodes 76, 76' a voltage $\Delta V$ represented by the following formula:

$$\Delta V = b \cdot \rho \cdot J_2 \cdot \pi_{63}' \cdot \sigma_Z \cdot k1 \tag{1}$$

wherein $\rho$ represents the resistivity of the Si single crystal 70, $J_2$ a current density, and $\pi_{63}'$ a piezoresistive coefficient.

The feature of the present invention lies in that the Si single crystal 70 is so formed that the piezoresistive coefficient $\pi_{63}'$ takes a sufficiently large value in order to output from the output voltages 76, 76' the voltage $\Delta V$ which corresponds to the compression force.

The present inventors calculated the piezoresistive coefficient $\pi_{63}'$, which is essential for obtaining the voltage $\Delta V$ from the Si single crystal 70, while varying the direction in which the electrodes are provided on the four Si single crystals having typical crystal faces (100), (110), (111) and (211), respectively. As a result, it has been found that in the case of (100), (111) and (211), the piezoresistive coefficient $\pi_{63}'$ becomes zero irrespective of the direction in which the electrodes are provided, while in the case of (110), when the electrodes are provided in the direction having an angle of 45 degrees with the direction of [001] or [1$\bar{1}$0], the maximum piezoresistive coefficients $\pi_{63}'$ having the same absolute value is obtained.

FIG. 5 shows the results of the calculation of the piezoresistive coefficient $\pi_{63}'$ of a p-type Si single crystal having a crystal face of (110) and a resistivity of 7.8 $\Omega$cm. It is clear that when the output electrodes 76, 76' are provided in the direction having an angle of 45 degrees with the direction of [001] and the input electrodes 78, 78' are provided in the direction having an angle of 45 degrees with the direction of [1̄10], the maximum piezoresistive coefficient $\pi_{63}'$ is obtained.

It is also possible to utilize the piezoresistive coefficient $\pi_{63}'$ in the same way and realize a semiconductor pressure transducer in accordance with the present invention direction having an angle of 45 degrees with the direction of [1̄10] and the input electrodes 78, 78' in the direction having an angle of 45 degrees with the direction of [001].

The directions of [001] and [1̄10] are typical directions of crystallization in the Si single crystal having a crystal face of (110) and other directions of crystallization which are equivalent thereto may also be considered completely in the same way.

Table 1 shows the crystal faces which are equivalent to the crystal face (110) of the Si single crystal 70 and the directions of crystallization which are equivalent to the directions of [001] and [1̄10]. As is clear from Table 1, there are a plurality of crystal faces in an Si single crystal which are equivalent to the crystal face (110) of the Si single crystal 70. Accordingly, it is possible to form a pressure detector 20 in accordance with the present invention by using an Si single crystal having a crystal face which is equivalent to the crystal face (110).

The crystal face equivalent to the crystal face (110) is represented by {110} and the directions of crystallization which are equivalent to [001] and [1̄10] are generally represented by <001> and <110>, respectively.

TABLE I

| Crystal face | Direction of output electrode | Direction of input electrode |
|---|---|---|
| (1̄10) | [001] | [1̄1̄0] |
| (1̄10) | [001] | [110] |
| (1̄10) | [001] | [11̄0] |
| (110) | [001] | [11̄0] |
| (1̄01) | [010] | [1̄01̄] |
| (1̄01) | [010] | [101] |
| (1̄01) | [010] | [101̄] |
| (101) | [010] | [10̄1̄] |
| (01̄1) | [100] | [01̄1̄] |
| (01̄1) | [100] | [011] |
| (01̄1) | [100] | [011̄] |
| (011) | [100] | [011̄] |

Although the piezoresistive coefficient $\pi_{63}'$ of the p-type Si single crystal 70 is shown in FIG. 5, it goes without saying that the piezoresistive coefficient $\pi_{63}'$ having a similar magnitude also exists in the n-type Si single crystal having the crystal face of (110).

In this way, a pressure transducer according to the present invention can accurately output the voltage $\Delta V$ corresponding to the pressure P from the output electrodes 76, 76' of the Si single crystal 70 by adopting the novel structure in which the pressure applied to the diaphragm 10 is applied perpendicularly to the crystal face 72 of (110) of the Si single crystal 70 through the seat 80.

In the present invention, the Si single crystal 70 is cut out in such a manner as to have a rectangular (including a square) crystal face 72 and has uniform thickness and impurity density. The output electrodes 76, 76' are provided on the Si single crystal 70 with a space b therebetween and the input electrodes 78, 78' are also provided on the Si single crystal 70 with a predetermined space therebetween.

Such arrangement of the electrodes 76, 76', 78 and 78' makes the resistances between the electrodes 76 and 78, 78 and 76', 76 ' and 78 ' and 78 ' and 76 equal to each other. Since the thickness and the impurity density of the Si single crystal 70 is uniform, it is also possible to make the resistances with respect to change of temperature equal to each other.

Consequently, if a current is applied to the Si single crystal 70 from the input electrodes 78, 78 ' of the Si single crystal 70 and the output voltage is taken out of the output electrodes 76, 76', the offset voltage is maintained substantially at zero irrespective of a change of the temperature. In this way, one Si single crystal 70 which replaces the Wheatstone bridge circuit constituted by a plurality of semiconductor strain gauges in the related art solves one of the above-described problems.

It is in order to prevent the compression force W from concentrating on the Si single crystal 70 that the compression force W is applied to the Si single crystal 70 through the seat 80.

As is well known, the Si single crystal 70 is a material having excellent mechanical strength and a broad elasticity region. However, if the compression force W is concentrated on one point of the Si single crystal, it is naturally broken in spite of the excellent mechanical strength.

It is therefore necessary in measuring the compression force W by using the Si single crystal 70 bonded to the support base 90 to avoid the perpendicular concentration of the compression force on the crystal face 72 of the Si single crystal 70 due to a small contacting area.

For this purpose, in the present invention, the seat 80 is provided as the means for transmitting the compression force which prevents the concentration of the compression force W on the crystal face 72 of the Si single crystal 70, thereby transmitting the compression force W to the crystal face 72 of the Si single crystal 70 while constantly dispersing the compression force W.

It is preferable that the seat 80 has a height C of not less than d/2 which is assumed to be the radius of the circumcircle of the bonding area (the area of the bonding surface) in which the crystal face 72 and the seat 80 are bonded together. The thus-set height C of the seat 80 enables the compression stress $\sigma_Z$ transmitted to the Si single crystal 70 to be uniformly dispersed as a sufficiently small value with respect to the breaking stress of the Si single crystal 70. It goes without saying that the upper limit of the height C of the seat 80 is restricted to the range which does not produce buckling due to the compression force W and does not reduce the efficiency of transmitting the compression force W in a disperesed state to obtain the measured voltage $\Delta V$.

In the present invention, the support base 90 is preferably provided with a sufficient rigidity in the direction of the Z-axis in which the compression stress $\sigma_Z$ is produced for preventing the stress (other than the compression stress $\sigma_Z$) or the like which obstructs the effective utilization of the piezoresistive coefficient $\pi_{63}'$ from being sensed. If the support base 90 is provided with such rigidity, when the compression force W is applied perpendicularly to the crystal face 72 of the Si single crystal 70, the simple compression stress $\sigma_Z$ acts on the Si single crystal 70, thereby enabling the effective utilization of the piezoresistive coefficient $\pi_{63}'$.

In order to avoid the deleterious influence of an adhesive on the characteristics, the seat 80 and the base support 90 are preferably bonded to the crystal face 72 of the Si single crystal 70 without using an adhesive. The seat 80 and the base support 90 are preferably made of a material such as crystallized glass which is electrically insulated from the Si single crystal 70 and has a mechanical strength not less high than the Si single crystal 70 and a thermal expansion coefficient approximate to that of the Si single crystal.

When the pressure P of high-temperature and high-pressure fluid is measured by such a semiconductor pressure transducer, the temperature of the diaphragm 10 which is exposed to the high-temperature and high-pressure fluid is raised. In this state, there is a fear of the heat stored in the diaphragm 10 being transferred to the Si single crystal 70 through the seat 80, thereby lowering the efficiency of the semiconductor pressure transducer itself.

If the compression force W transmitted to the contacting portion of the back surface of the diaphragm 10 and the seat 80 exceeds the mechanical strength of the seat 80, there is a fear of the seat 80 being broken, thereby lowering the reliability of the semiconductor pressure transducer.

In order to enhance the efficiency and the reliability of the semiconductor pressure transducer itself, it is therefore preferable that the seat 80 not only has a function of transmitting the pressure P applied to the diaphragm 10 to the Si single crystal 70 as the compression force W but also serves as a heat resistor and has a high mechanical strength.

For this purpose, the seat 80 is preferably formed as a composite seat by using different materials for the portion which is to be bonded to the Si single crystal 70 and the portion which is to be brought into contact with the diaphragm 10. The portion which is to be bonded to the Si single crystal 70 is made of a material thermally insulated from the Si single crystal 70 and having a thermal expansion coefficient approximate to that of the Si single crystal 70, in other words, an insulating material such as crystallized glass, glass borosilicate and cordierite porcelain. The portion which is to be brought into contact with the diaphragm 10 is made of a material more excellent in mechanical strength or thermal insulation property than the insulating material for the portion being bonded to the Si single crystal 70. As examples of such material, metals, oxide ceramics, nitride ceramics and carbide ceramics will be cited.

Any bonding method such as diffusion bonding and adhesion using a high-temperature adhesive as well as electrostatic bonding and direct bonding may be adopted for bonding the materials for the composite seat with each other so long as fundamentally it does not impair the function of the materials as a material of transmitting force.

The same effect is achieved by providing a member made of a material excellent in thermal insulation property and mechanical strength in the region of the diaphragm 10 which is in contact with the seat 80 in place of using the composite seat.

As explained above, the present invention adopts a novel structure for transmitting the pressure applied to the diaphragm to the crystal face {110} of the Si single crystal through the seat serving as the transmitting means.

According to the present invention, it is possible to measure pressure accurately by effectively utilizing the piezoresistive effect of the Si single crystal on the pressure applied to the diaphragm without deleterious influence of the adhesive and the strain generator on the characteristics which is inevitable in a conventional semiconductor pressure transducer.

According to the present invention, since one Si single crystal has a function of a Wheatstone bridge circuit, it is possible to replace the plurality of semiconductor strain gauges in the related art by one Si single crystal, thereby producing a semiconductor pressure transducer having a simple structure at a low cost.

The above and other objects, features and advantages of the present invention will become clear from the following description of the preferred embodiments thereof, taken in conjunction with the accompanying drawings.

BRIEF DESCRIPTION OF THE DRAWINGS

FIG. 1 is an explanatory view of a semiconductor pressure transducer according to the present invention, wherein

FIG. 4 is an explanatory view of a pressure detector used in the present invention, wherein

FIG. 6 is an explanatory view of a first embodiment of a semiconductor pressure transducer according to the present invention, wherein FIG. 6(A) is a plan view and FIG. 6(B) a side elevational view thereof;

FIG. 10 is an explanatory view of the principle of the detection of a preferred pressure detector in accordance with the present invention, wherein

FIG. 17 is an explanatory view of an example of a preferred pressure detector used in the combustion pressure sensor shown in FIG. 16, wherein

DESCRIPTION OF THE PREFERRED EMBODIMENTS

Figure 1A:
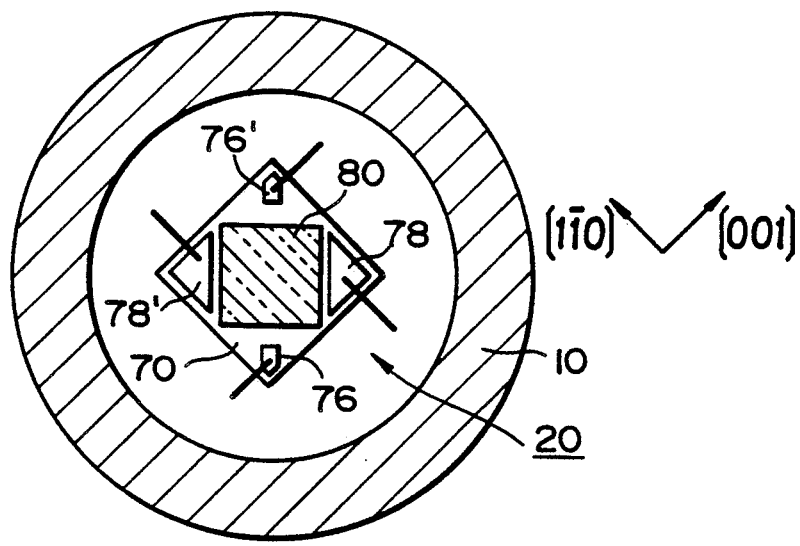
FIG. 1(A) is a plan view and FIG. 1(B) is a side elevational view thereof.
Figure 1B:
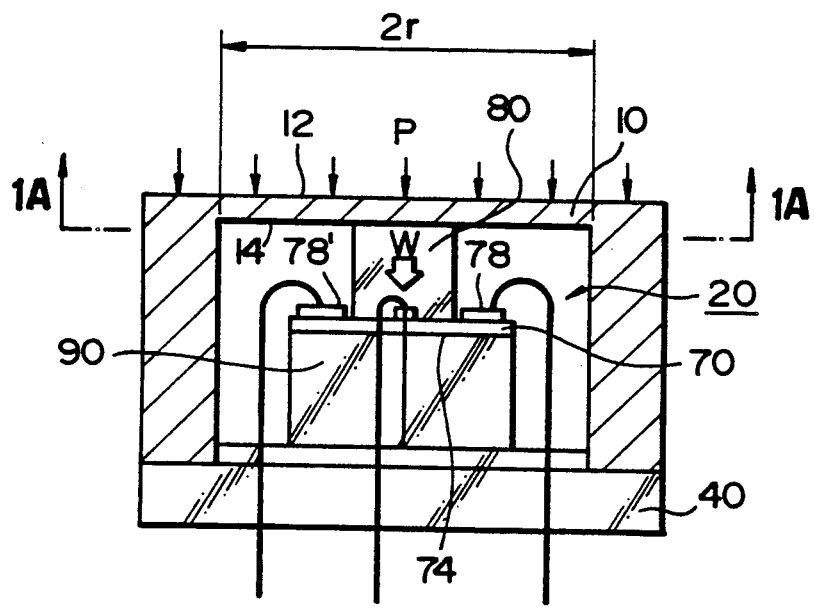
Figure 2:
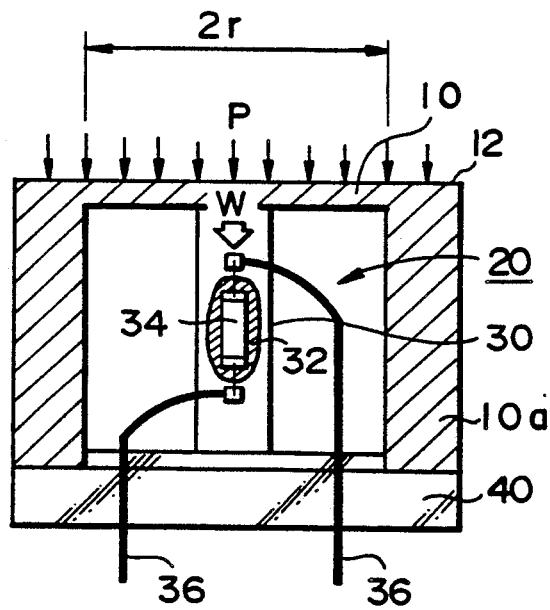
FIG. 2 is an explanatory view of a conventional strain-gauge semiconductor pressure transducer.
Figure 3:
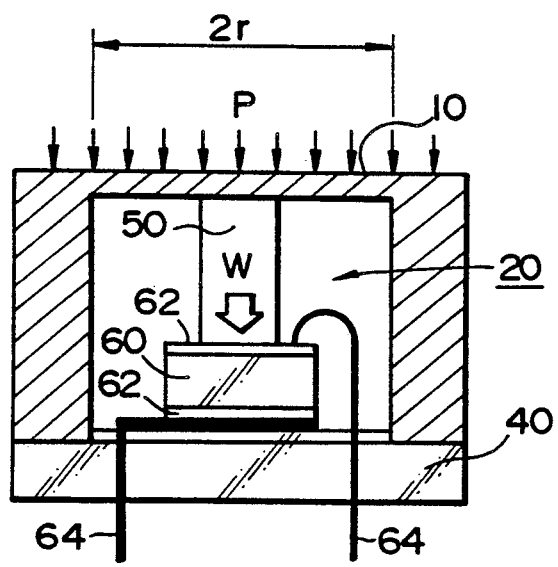
FIG. 3 is an explanatory view of a conventional piezoelectric semiconductor pressure transducer.
Figure 5:
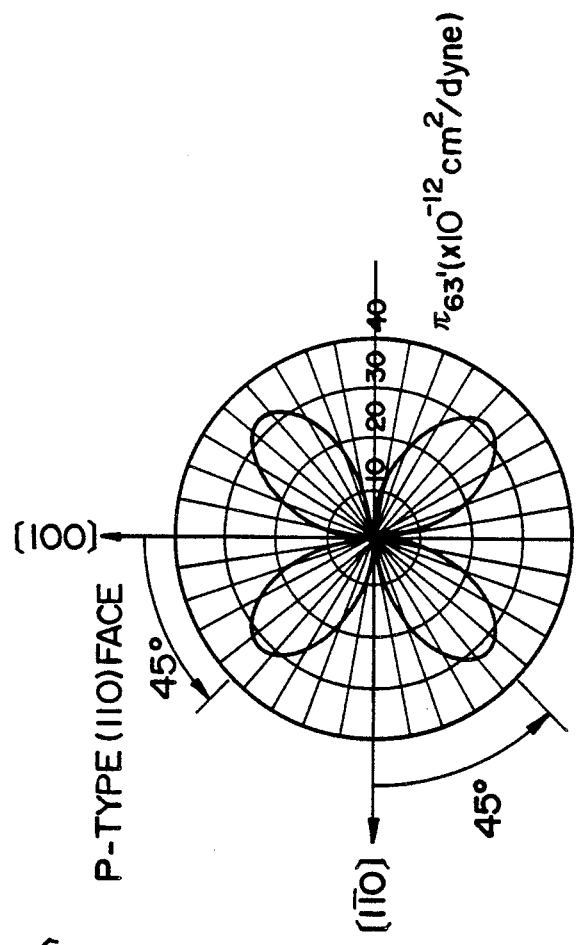
FIG. 5 shows the characteristics of the piezoresistive coefficient $\pi_{63}'$ the crystal face (110) of the Si single crystal.

Preferred embodiments of the present invention will be explained with reference to the accompanying drawings.

First Embodiment

FIG. 6 is an explanatory view of a first embodiment of a semiconductor pressure transducer according to the present invention, wherein FIG. 6(A) is a plan view and FIG. 6(B) a side elevational view thereof.

The semiconductor pressure transducer is composed of a diaphragm 10 provided with a cylindrical supporting portion (not shown) which is secured to a supporting plate 40, and a pressure detector 20 for detecting the pressure P applied to the surface 12 of the diaphragm 10.

The pressure detector 20 includes an Si single crystal 70 so formed as to have a crystal face of (110) as the surface to which a pressure is applied, one crystal face 74 of the Si single crystal 70 being electrostatically bonded to a support base 90 which is secured to the supporting plate 40. The Si single crystal 70 in this embodiment is a p-type Si single crystal having a resistivity of 10 Ωcm, an area of 1.7 mm², a thickness of 0.2 mm. The support base 90 is composed of crystallized glass having an area of 1.7 mm² and a height of 1 mm.

To the other crystal face 72 of the Si single crystal 70, one end of a composite seat 81 is electrostatically bonded and the other end of the composite seat 81 is in contact with the center of the back surface of the diaphragm 10.

The composite seat 81 includes a first seat portion 80a which is bonded to the Si single crystal 70 and a second seat portion 80b which is in contact with the diaphragm 10. The first and second seat portions 80a and 80b are integrally bonded with each other through a bonding layer 80c.

The first seat portion 81a is preferably composed of a material electrically insulated from the Si single crystal 70 and having a thermal expansion coefficient which is approximate to that of the Si single crystal 70. In this embodiment, crystallized glass 1 mm² in area and 1 mm in height is used. The second seat portion 81b is preferably composed of a material having a more excellent thermal insulation property or mechanical strength than the material for the first seat portion 81a. In this embodiment, stabilized ZrO₂ 1 mm² in area and 2 mm in height is used. The composite seat 81 composed of the first and second seat portions 81a and 81b are electrostatically bonded integrally with the Si single crystal 70.

As shown in FIG. 6(A), on one crystal face 72 of the Si single crystal 70, a pair of output electrodes 76, 76' having a width of 1.0 mm are provided in the direction having an angle of 45 degrees with the direction of [001] with a distance b of 1.2 mm therebetween. A pair of input electrodes 78, 78 ' having a width of 0.9 mm are provided in the direction having an angle of 45 degrees with the direction of [1$\bar{1}$0]. Each of these electrodes 76, 76', 78, 78 ' is provided on the crystal face 72 of the Si single crystal 70 by the deposition of aluminum.

One end of each Au lead wire 92 having a diameter of 50 μm is connected to the corresponding electrodes 76, 76', 78, 78'. The other end of each Au lead wire 92 is electrically connected to the outside through the corresponding input and output terminal 94.

The diaphragm 10 is so designed as to have the surface 12 parallel to the crystal face of the Si single crystal 70, whereby the pressure P applied to the surface 12 of the diaphragm 10 is transmitted perpendicularly to the crystal face 72 of the Si single crystal 70 through the seat 80 as the compression force W.

In this embodiment, the supporting plate 40 is composed of an insulating material so as to prevent the heat stored in the diaphragm 10 from being transferred to the pressure detector 20, in particular, to the Si single crystal 70.

Figure 7:
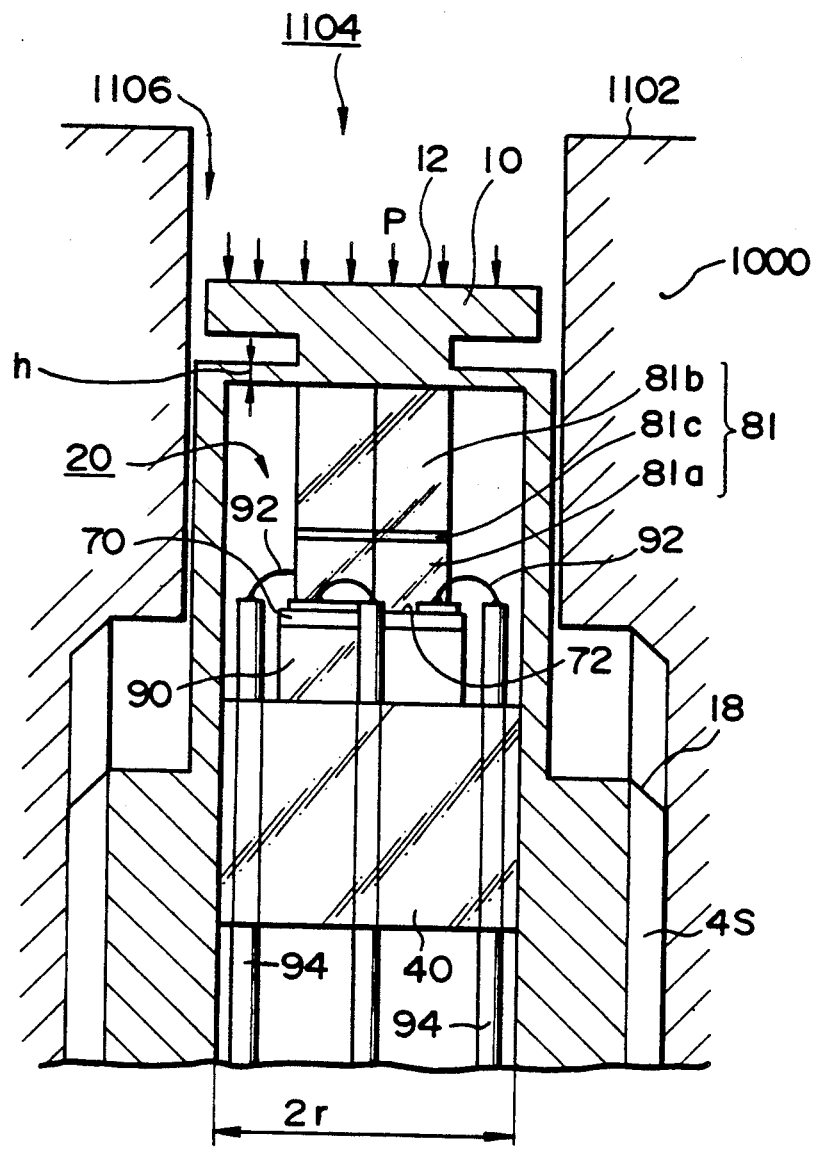
FIG. 7 is an explanatory view of the embodiment shown in FIG. 6 which is used for measuring the pressure of the combustion gas of a four-cycle and four-cylindered gasoline engine.

FIG. 7 is an explanatory view of the semiconductor pressure transducer shown in FIG. 6 which is used for measuring the pressure of the combustion gas of a four-cycle and four-cylindered gasoline engine.

The semiconductor pressure transducer is secured to a mounting hole 1106 formed on the side wall 1102 of a cylinder head 1000 toward a combustion chamber 1104.

The diaphragm 10 of the semiconductor pressure transducer is formed into a cylindrical shape having a radius r of 2 mm by using stainless steel of 0.2 mm in thickness. The semiconductor pressure transducer is secured to the mounting hole 1106 with a space of 2 mm between the surface 12 of the diaphragm 10 and the side wall 1102 of the cylinder head 1000 by engaging a fixing screw 4s of M8 provided on the cylindrical side wall 18 of the diaphragm 10 with a groove provided on the inner wall of the mounting hole 1106.

The operation of the semiconductor pressure transducer in this embodiment will be explained in the following.

In the combustion chamber 1104 of the four-cylindered gasoline engine, the combustion gas produced in one of the four cycles and having a temperature of not lower than 1,000° C. and a pressure of about 40 kg/cm² acts on the surface 12 of the diaphragm 10 as high-temperature and high-pressure fluid.

The pressure P of the combustion gas is converted into the compression force W through the diaphragm 10 and acts uniformly and perpendicularly to the crystal face 72 of the Si single crystal 70 through the composite seat 81 as the compression stress $\sigma_z$. The Si single crystal 70 outputs the voltage ΔV represented by the formula (1), namely, the measured voltage ΔV which is proportional to the pressure P to the outside through the lead wires 92 and the terminals 94.

In this way, the semiconductor pressure transducer in this embodiment can measure the pressure P of the high-temperature and high-pressure fluid applied to the surface 12 of the diaphragm 10 accurately as the measured voltage ΔV output from the Si single crystal 70.

In measuring the pressure of high-temperature and high-pressure fluid as in this embodiment, the diaphragm 10 itself is generally exposed to the high-temperature and high-pressure fluid and is heated up to a considerably high temperature range.

In this embodiment, however, since the composite seat 81 is composed of the first and second seat portions 81a and 81b, the heat transferred to the Si single crystal 70 is alleviated through the composite seat 81.

The stabilized ZrO₂ which constitutes the second seat portion 81b has higher mechanical strength than the crystallized glass which constitutes the first seat portion 81a. Particularly, the stabilized $ZrO_2$ shows a strength of about 250 kg/mm$^2$ against compression, which is not less than 4 times the strength of the crystallized glass constituting the first seat portion 81a. In addition, the thermal conductivity, which represents the thermal insulation property, of the second seat portion 81b is about 0.005 cal/cm·sec·° C., which is not less than that of the first seat portion 81a. Thus, even when the pressure P, of e.g., more than 100 kg/cm$^2$ of high-temperature and high-pressure fluid is applied to the diaphragm 10, the composite seat 81 is not broken and the heat transfer to the Si single crystal 70 is interrupted, thereby enabling the compression force W to be transferred to the crystal face 72 of the Si single crystal 70 stably and accurately.

Furthermore, since the supporting plate 40 is also made of a thermally insulating material so as to prevent the heat of the diaphragm 10 from being transferred to the Si single crystal 70 through the supporting plate 40. Consequently, according to this embodiment, since the temperature of the Si single crystal 70 is not raised up to a region which impairs the characteristics even when high-temperature and high-pressure fluid acts on the diaphragm 10, stable and accurate measurement of the pressure P of the high-temperature and high-pressure fluid is enabled.

In order to examine the efficiency of the semiconductor pressure transducer of the present invention which is used for measuring the pressure of high-temperature and high-pressure fluid, the four-cycle and four-cylindered gasoline engine was actuated with the total load at 6,000 rpm and the measured voltage $\Delta V$ output from the semiconductor pressure transducer was recorded in an oscillograph.

Figure 8:
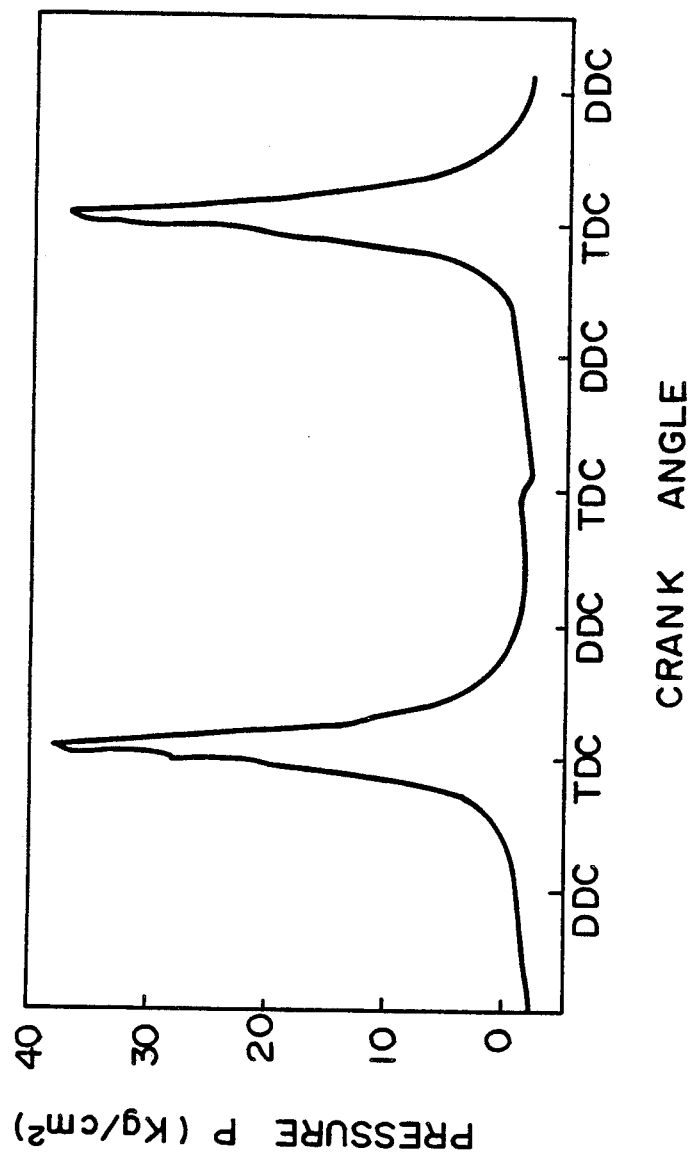
FIG. 8 is a characteristic curve of the embodiment shown in FIG. 6.

FIG. 8 shows the measured data, wherein the abscissa represents a crank angle and the ordinate represents the measured voltage $\Delta V$ output from the semiconductor pressure transducer of the present invention converted into the pressure P of the combustion gas with respect to the crank angle.

As is clear from FIG. 8, it was confirmed that the semiconductor pressure transducer of the present invention can accurately detect the pressure P of the combustion gas which is considered to be difficult to measure by a conventional pressure transducer, especially, by a pressure transducer using a semiconductor single crystal, namely, the pressure P of the combustion gas of an engine actuated at 6,000 rpm with the total load, the pressure changing with a change of the crank angle.

In this embodiment, the composite seat 81 and the supporting plate 40 are so formed as to make the heat transfer from the diaphragm 10 to the Si single crystal 70 difficult. By virtue of this structure, the measured voltage $\Delta V$ was stably output from the Si single crystal in the 100-hour continuous measurement of the pressure P of high-temperature and high-pressure fluid. Thus, it was also confirmed that the semiconductor pressure transducer of the present invention has high reliability as a device for measuring the pressure of high-temperature and high-pressure fluid.

Second Embodiment

Figure 9:
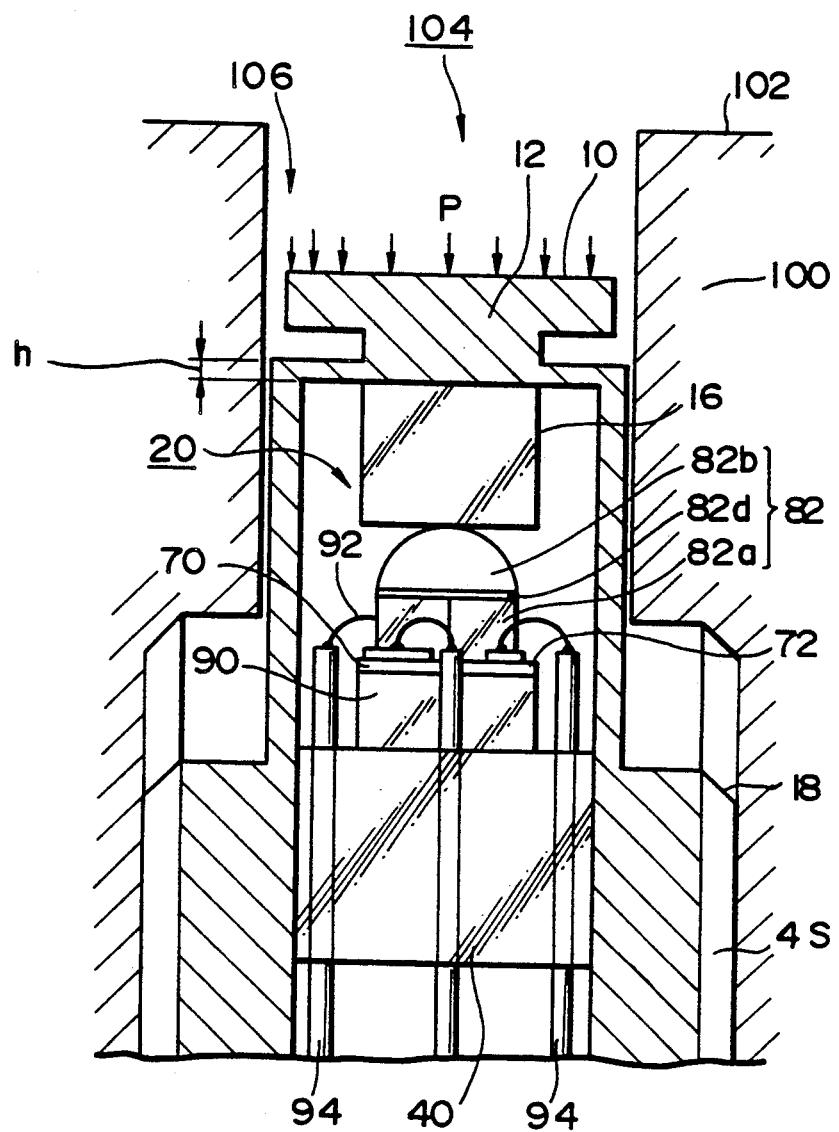
FIG. 9 is an explanatory view of another embodiment of a semiconductor pressure transducer according to the present invention.

FIG. 9 shows another embodiment of a semiconductor pressure transducer according to the present invention.

A first characteristic of this embodiment lies in a composite seat 82. The composite seat 82 includes a first seat portion 82a composed of crystallized glass 1 mm$^2$ in area and 0.75 mm in height and a second seat portion 82b composed of a split steel sphere 1.5 mm in diameter. The first and second seat portions 82a and 82b are integrally provided through a high-temperature adhesive 82d.

The first seat portion 82a of the thus-obtained composite seat 82 is electrostatically bonded to the crystal face 72 of the Si single crystal 70.

A second characteristic of this embodiment is that a pressure transmitting portion 16 for accurately transmitting the pressure P applied to the diaphragm 10 to the composite seat 82 is provided at the center of the back surface of the diaphragm 10, and that the pressure transmitting portion 16 is composed of stabilized $ZrO_2$ having a higher mechanical strength and not less high thermal conductivity than the crystallized glass which constitutes the first seat portion 82a. The pressure transmitting portion 16 is 1.7 mm$^2$ in area and 2 mm in height.

The semiconductor pressure transducer of this embodiment having the above-described structure enables accurate measurement of the pressure P of high-temperature and high-pressure fluid as the first embodiment.

Furthermore, according to the second embodiment, since the second seat portion 82b is composed of the split steel sphere which is more excellent in mechanical strength than crystallized glass, the compression force W converted by the diaphragm 10 is constantly applied to the center of the composite seat 82, thereby enabling more accurate measurement of the pressure P applied to the surface of the diaphragm 10.

Although the composite seat of the semiconductor pressure transducers is composed of two kinds of materials in the first and second embodiments, the number of kinds of the materials is not restricted to two and may be three or more as occasion demands.

An Si single crystal having a crystal face of (110) is used for the pressure detector in these embodiments, but an Si single crystal having a crystal face of {110} which is equivalent to the crystal face (110), as shown in Table 1, may be used for the pressure detector.

Other examples of pressure detector

Other examples of the pressure detector 20 used in the semiconductor pressure transducer of the present invention will be explained in detail with reference to the following first to third pressure detectors. The same reference numerals are provided with the elements which are the same as those in the first and second embodiments, and explanation thereof will be omitted.

First pressure detector

Figure 10A:
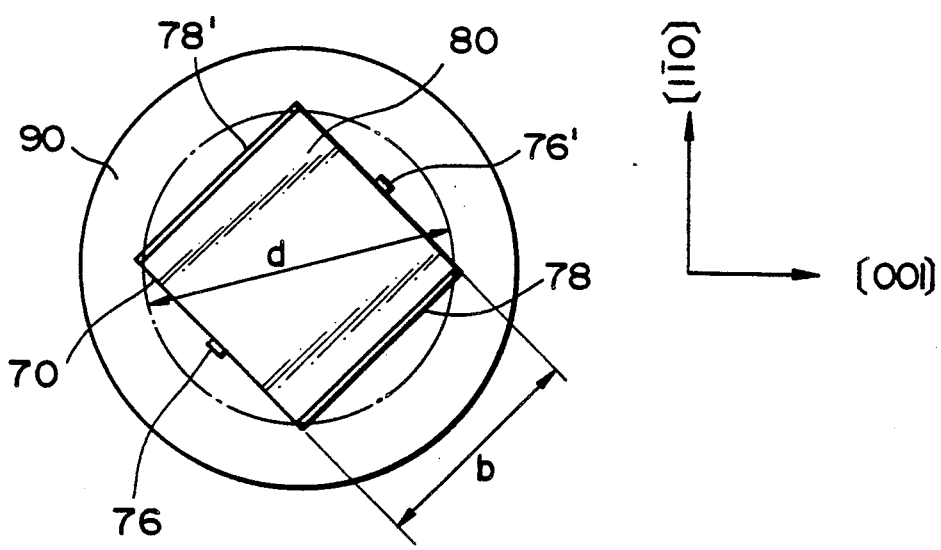
FIG. 10(A) is a plan view of the pressure detector and FIG. 10(B) a side elevational view thereof.
Figure 10B:
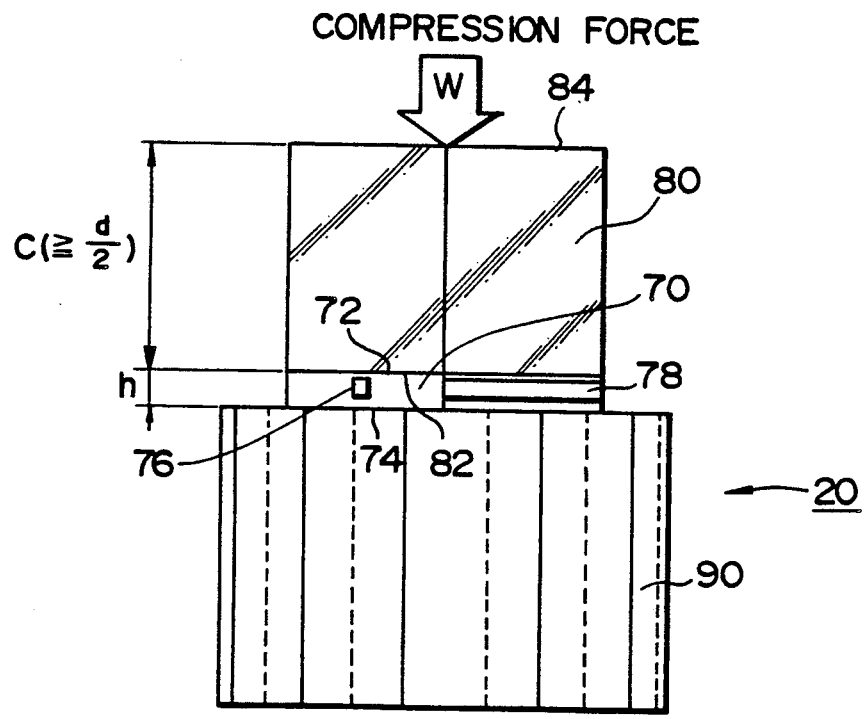

FIG. 10 shows a first pressure detector 20.

The first pressure detector 20 includes the Si single crystal 70 so formed as to have a crystal face of (110) as the surface to which a compression force is applied, the seat 80 bonded to the crystal face 72 of (110) of the Si single crystal 70 and transmitting the pressure P applied to the diaphragm 10 perpendicularly to the crystal face 72 as the compression force W, and the support base 90 bonded to the other crystal face 74 of the Si single crystal 70 and supporting the Si single crystal 70.

The Si single crystal 70 is provided with the electrodes 76, 76', 78 and 78', as in the first and second embodiments.

In measuring the compression force W by the pressure detector 20, a current I is first applied to the Si single crystal 70 from the input electrodes 78, 78' so that the voltage $\Delta V$ is taken out of the output electrodes 76, 76', and in this state the compression force W is applied to the top surface 84 of the seat 80. The compression stress $\sigma_Z$ acts on the Si single crystal 70, whereby the voltage $\Delta V$ represented by the following formula is output from the output electrodes 76, 76':

$$\Delta V = b \cdot \rho \cdot J_2 \cdot \sigma_Z \cdot k_1 \quad (1)$$

wherein $\rho$ represents the resistivity of the Si single crystal 70, $J_2$ a current density, and $\pi_{63}'$ a piezoresistive coefficient.

a. Impurity density of Si single crystal

The current density $J_2$ flowing in the Si single crystal 70 is represented by the following formula:

$$J_2 = I/(b \cdot h) \quad (2)$$

wherein h represents the thickness of the Si single crystal 70.

By substituting the formula (2) into the formula (1), the following formula represented the measured voltage $\Delta V$ is obtained:

$$\Delta V = \rho \, (1/h) \cdot \pi_{63}' \cdot \sigma_Z \cdot k_1 \quad (3)$$

As is clear from the formula (3), if any of the resistivity $\rho$ of the Si single crystal 70, the current value I with respect to the thickness h of the Si single crystal 70 and the compression stress $\sigma_Z$ is increased together with the piezoresistive coefficient $\pi_{63}'$, the voltage $\Delta V$ output from the pressure detector 20 is increased.

Actually, however, the resistivity $\rho$, the current value I and the compression stress $\sigma_Z$ of the Si single crystal 70 cannot be increased to a range exceeding commonsense for the following reasons.

It is difficult to provide a commercially available Si single crystal 70 of a p or n-conduction type with intrinsic characteristics having a resistivity $\rho$ exceeding $1 \times 10^4$ $\Omega$cm.

In addition, if the resistivity $\rho$ of the Si single crystal 70 exceeds 10 $\Omega$cm, it is difficult to produce good electrical connection between a plurality of electrodes provided thereon.

If the resistivity $\rho$ of the Si single crystal 70 at room temperature leaves the range of 10 $\Omega$cm (corresponding to an impurity density of about $1 \times 10^{15}/\text{cm}^3$) to $1 \times 10^{-4}$ $\Omega$cm (corresponding to an impurity density of about $1 \times 10^{21}/\text{cm}^3$), the change in the measured voltage $\Delta V$ with a change in room temperature is disadvantageously greatly increased.

For these reasons, the Si single crystal 70 constituting the pressure detector 20 of the present invention preferably has a resistivity $\rho$ controlled in the range of 10 $\Omega$cm to $1 \times 10^{-4}$ $\Omega$cm and, hence, the impurity density of the Si single crystal 70 is controlled in the range of $1 \times 10^{15}\text{cm}^3$ to $1 \times 10^{21}\text{cm}^3$.

Since the piezoresistive coefficient $\pi_{63}'$ of the Si single crystal 70 depends on the resistivity $\rho$, the range of the piezoresistive coefficient $\pi_{63}'$ is also restricted for the same reason.

It is known that the breaking strength of the Si single crystal 70 against a compression force is about 50 kg/mm² at maximum. It is therefore necessary to prevent the compression stress $\sigma_Z$ exceeding the breaking strength of 50 kg/mm² from being applied to the Si single crystal 70. It is preferable to apply a compression stress of nor more than 25 kg/mm².

It is also necessary to see that the current value I flowing in the Si single crystal 70 is not excessive. If an excess current I flows in the Si single crystal 70, the Si single crystal 70 itself releases much heat as an electric resistor, thereby exerting deleterious influence on the other characteristics not to mention of the measured voltage $\Delta V$.

In the experiments carried out by the present inventors, if the current I was applied in the range in which the consumption power does not exceed about 30 mW, no deleterious influence on the characteristics was observed.

The preferred conditions for obtaining a large measured voltage $\Delta V$ from the Si single crystal 70 will be collectively described in the following.

Firstly, the impurity density of the Si single crystal 70 is controlled in the range of $1 \times 10^{15}/\text{cm}^3$ to $1 \times 10^{21}\text{cm}^3$.

Secondly, the compression stress $\sigma_Z$ applied to the Si single crystal 70 does not exceed the limitation of the breaking strength of the Si crystal single 70. It has been confirmed from the experiments that a compression stress $\sigma_Z$ not exceeding 50 kg/mm² is allowable and a compression stress $\sigma_Z$ not exceeding 25 kg/mm² is preferable.

Thirdly, the current I flowing in the Si single crystal 70 is set in the range which does not cause the Si single crystal 70 to release much heat. It has been confirmed from the experiments that the current I set in the range in which the consumption power does not exceed about 30 mW is preferable.

b. Thickness h of Si single crystal

The present inventors investigated the reduction in h in the formula (3), namely, the thickness h of the Si single crystal 70 in order to further increase the voltage $\Delta V$ output from the Si single crystal 70 while satisfying the above-described preferred conditions.

The Si single crystal 70 is generally produced from an Si single crystal wafer having a diameter of not less than 1.5 inches. As well known, the Si single crystal wafer is produced to a thickness of at least 200 $\mu$m for facilitating handling in various IC processings. A commercially available wafer 5 inches in diameter has a thickness of about 500 $\mu$m.

In manufacturing the pressure detector 20, a commercially available Si single crystal wafer having a crystal face of (110) is first cut out to form the Si single crystal 70. The crystal face 74 of (110) is bonded to the support base 90 and lined to facilitate handling. The other crystal face 72 of the Si single crystal 70 is ground by a chemical method together with a mechanical method to a thickness of not more than 50 $\mu$m, which is considered to be difficult to produce and put on the market as an ordinary Si single crystal.

The output electrodes 76, 76' and the input electrodes 78, 78' are attached to the Si single crystal 70 and the seat 80 is bonded to the crystal face 72.

In this way, the first pressure detector 20 is capable of producing the measured voltage $\Delta V$ which is sufficiently large for practical use while satisfying the preferred conditions for the Si single crystal 70 by reducing the thickness h of the Si single crystal 70 to not more than 50 $\mu$m.

It has been confirmed from the experiments carried out by the present inventors that when the pressure detector 20 shown in FIG. 10 is manufactured by using the Si single crystal 70 with the impurity density controlled in the range of $1 \times 10^{15}\text{cm}^3$ to $1 \times 10^{21}/\text{cm}^3$ and the crystal face ground to a thickness h of 20 $\mu$m, the influence of temperature on the characteristics is smaller in comparison with the pressure detector using the Si single crystal 70 having a thickness of not less than 200 μm and the measured voltage ΔV 10 times as large as the voltage output from the latter pressure detector 20 is obtained.

Second pressure detector

Figure 11:
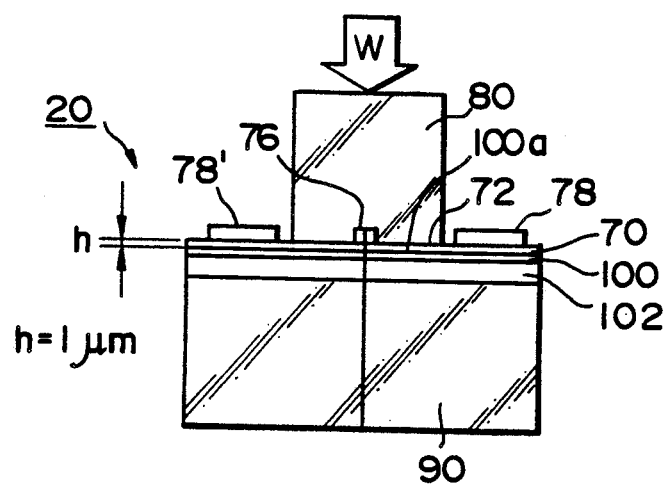
FIGS. 11 and 12 show other examples of the preferred pressure detector in accordance with the present invention.

FIG. 11 shows a second pressure detector 20.

The second pressure detector 20 includes a semiconductor layer 102 so formed as to have a crystal face of (110) which is covered with an insulation film 100, and the Si single crystal 70 grown on the insulation film 100. The crystal face 72 of the Si single crystal 70 is bonded to the seat 80, and the semiconductor layer 102 is bonded to the support base 90.

In the second pressure detector 20, the impurity density of the Si single crystal 70 is also controlled in the range of $1 \times 10^{15}/cm^3$ to $1 \times 10^{21}/cm^3$ so as to reduce the influence of temperature on the voltage ΔV.

In this range of impurity density, there is a region to which a self sensitivity compensating method (disclosed in Japanese Patent Publication No. 58791/1982) is applicable for suppressing the fluctuation of the measured voltage ΔV with change in temperature by utilizing the positive temperature characteristic of the resistance and the negative temperature characteristic of the piezoresistive coefficient $\pi_{63}'$ of the Si single crystal. For example, in the case of p-conduction type Si single crystal, the self sensitivity compensating method is applicable in two impurity density regions, namely, the regions of about $5 \times 10^{18}/cm^3$ and about $2 \times 10^{20}/cm^3$.

The impurity densities in these regions are about $2 \times 10^{-2} \Omega cm$ and $6 \times 10^{-4} \Omega cm$ in terms of resistivity ρ of the p-conduction type Si single crystal 70. If it is assumed that the pressure transducer 20 shown in FIG. 10 is formed from the Si single crystal 70 having a resistivity ρ of $6 \times 10^{-4} \Omega cm$ and a thickness of 200 μm, when the current I is applied to the Si single crystal 70 in the range in which the consumption power does not exceed 30 mW, and the compression force W of 50 kg/cm² in terms of a compression stress $\sigma_Z$, which is the maximum compression stress allowable, is applied thereto, the measured voltage ΔV becomes as small as 3 mV or less, which is unsuitable for practical use.

In this pressure transducer, in order to make the self sensitivity compensation method applicable and to obtain the measured voltage ΔV of not less than 10 mV, which is considered to be the lower limit for practical use, the thickness of the Si single crystal 70 must be not more than 1 μm.

It is, however, difficult to grind the crystal face to reduce the thickness h of the Si single crystal 70 to not more than 10 μm, especially not more than 1 μm and it is unavoidable that the production of the pressure detector from the Si single crystal 70 subjected to such grinding has very low yield.

The second pressure detector is characterized in that it is provided with the self sensitivity compensation function disclosed in Japanese Patent Publication No. 58791/1982 by forming the Si single crystal 70 having a crystal face (110) and a very small thickness h as shown in FIG. 11 by the following IC process manufacturing technique.

It is well known that thermal diffusion, CVD, etc can be adopted as a means for forming an electrical insulation film 100 such as $SiO_2$ and $Si_3N_4$ on the semiconductor layer 102.

As a means for forming the Si single crystal 70 on the insulation film 100, epitaxial growth and CVD are applicable. It is easy to form the Si single crystal 70 having a crystal face (110) and a thickness of not more than 20 μm by a combination of such at technique with a technique such as etching and laser recrystallization.

In the second pressure detector 20, the Si single crystal 70 is so formed as to have a self sensitivity compensation function by restricting the impurity density to about $5 \times 10^{18}/cm^3$ and about $2 \times 10^{20}cm^3$ in which the deleterious influence of change of temperature on the characteristics is small.

Thus, the second pressure detector 20 not only is provided with the self sensitivity compensation function but also can produce the measured voltage ΔV sufficiently large for practical use from the output electrodes 76, 76'.

In addition, since the Si single crystal 70 is provided on the electric insulation film 100 in the second pressure detector 20 in accordance with the present invention, there is no fear of electric leakage and since it is possible to have a comparatively high impurity density, the pressure transducer 20 can sufficiently withstand the use at a high temperature.

Third pressure detector

In the same way as in the second pressure transducer, a third pressure detector not only is provided with the self sensitivity compensation function but also can produce the measured voltage ΔV sufficiently large for practical use by forming the Si single crystal 70 having a crystal face (110) and having a small thickness by using the IC process manufacturing technique.

Figure 12:
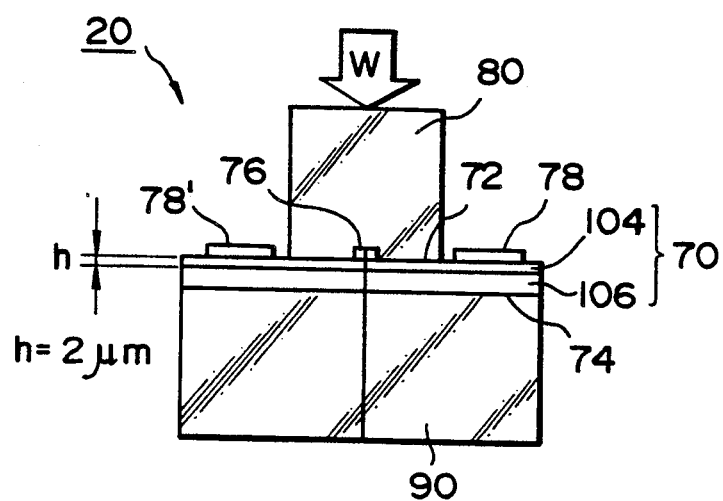

FIG. 12 shows a third pressure detector 20 of the present invention. In the third pressure detector 20, the Si single crystal 70 includes a conduction layer 104 in which the impurity density is controlled in the range of $1 \times 10^{15}/cm^3$ to $5 \times 10^{21}/cm^3$ and an insulation layer 106 provided adjacent to the conduction layer 104. The insulation layer 106 is bonded to the support base 90 and the conduction layer 104 is bonded to the seat 80.

It goes without saying that a pair of output electrodes 76, 76' and a pair of input electrodes 78, 78' provided on the Si single crystal 70 are electrically connected with at least the conduction layer 104, that in the conduction layer 104 the impurity density is controlled in the range of $1 \times 10^{15}/cm^3$ to $1 \times 10^{21}/cm^3$, and that the thickness h of the Si single crystal 70 is made small so as to take a large output voltage ΔV.

The conduction layer 104 is formed on the insulation layer 106 by thermal diffusion or ion implantation.

As a technique for electrically insulating the conduction layer 104 from the insulation layer 106, p-n junction isolation or what is called resistor layer isolation utilizing a difference in the resistance can be used. When adopting a technique of resistor layer isolation, the resistance of the passage of the conduction layer 104 in which a current flows is regulated to not more than 1/100 of the resistance of the passage of the insulation layer 106 in which a current flows in order to maintain the accuracy of 1%.

Owing to this structure, the third pressure transducer 20 not only is provided with the self sensitivity compensation function but also can produce a sufficiently large measured voltage ΔV from the output electrodes 76, 76' in the same way as in the second pressure transducer 20.

Modifications of the first to third pressure transducers are possible.

Figure 13:
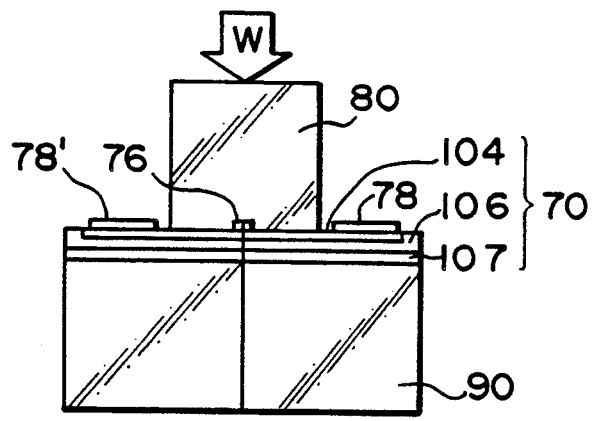
FIGS. 13 to 15 are explanatory views of modifications of the pressure detector shown in FIG. 12.

For example, FIG. 13 shows a modification of the third pressure transducer 20. In this example, the Si single crystal 70 includes the conduction layer 104 in which the impurity density is controlled in the range of $1 \times 10^{15}/cm^3$ to $1 \times 10^{21}/cm^3$ in order to detect the compression force applied thereto and the insulation layer 106 provided adjacent to the conduction layer 104 in order to be electrically insulated from the conduction layer 104. The conduction layer 104 and the insulation layer 106 are formed on the crystal face side of an Si single crystal layer 107 of 200 μm thick by impurity diffusion.

Owing to this structure, it is possible to take a measured voltage ΔV sufficiently large for practical use from the output electrodes 76, 76' in the same way as in the third pressure transducer 20 and to reduce the influence of change of temperature on the characteristics.

Figure 14:
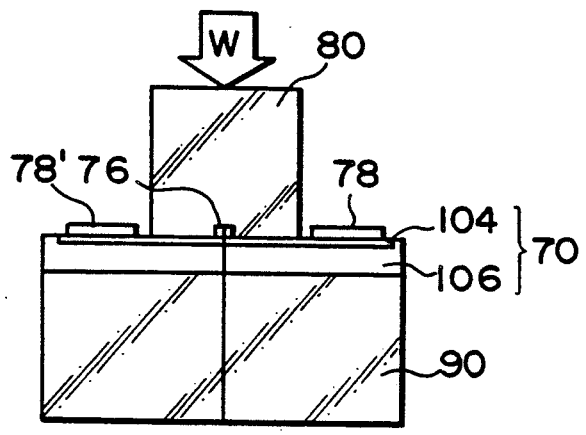

FIG. 14 shows another modification of the third pressure transducer 20. This pressure transducer is characterized in that the conduction layer 104 is so provided as not to protrude from the side surface of the Si single crystal 70. This structure also enables a sufficiently large measured voltage ΔV to be taken out in the same way as in the third pressure transducer 20 without much influence of change of temperature on the characteristics.

Figure 15:
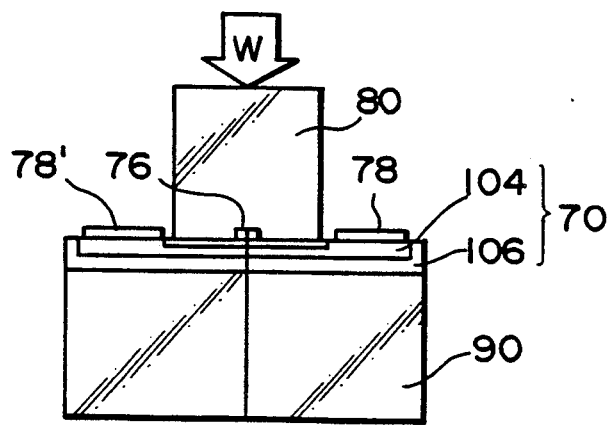

FIG. 15 shows still another modification of the third pressure transducer 20. This pressure transducer is characterized in that the conduction layer 104 is formed on the Si single crystal 70 having a crystal face (110) by ion implantation, thereby producing the same effect as the third pressure transducer 20.

An Si single crystal having a crystal face of (110) is used for these pressure detectors, but an Si single crystal having a crystal face of {110} which is equivalent to the crystal face (110), as shown in Table 1, may be used instead.

Third Embodiment

An embodiment of the present invention which is applied to a pressure sensor for high-temperature fluid will be explained.

Figure 16:
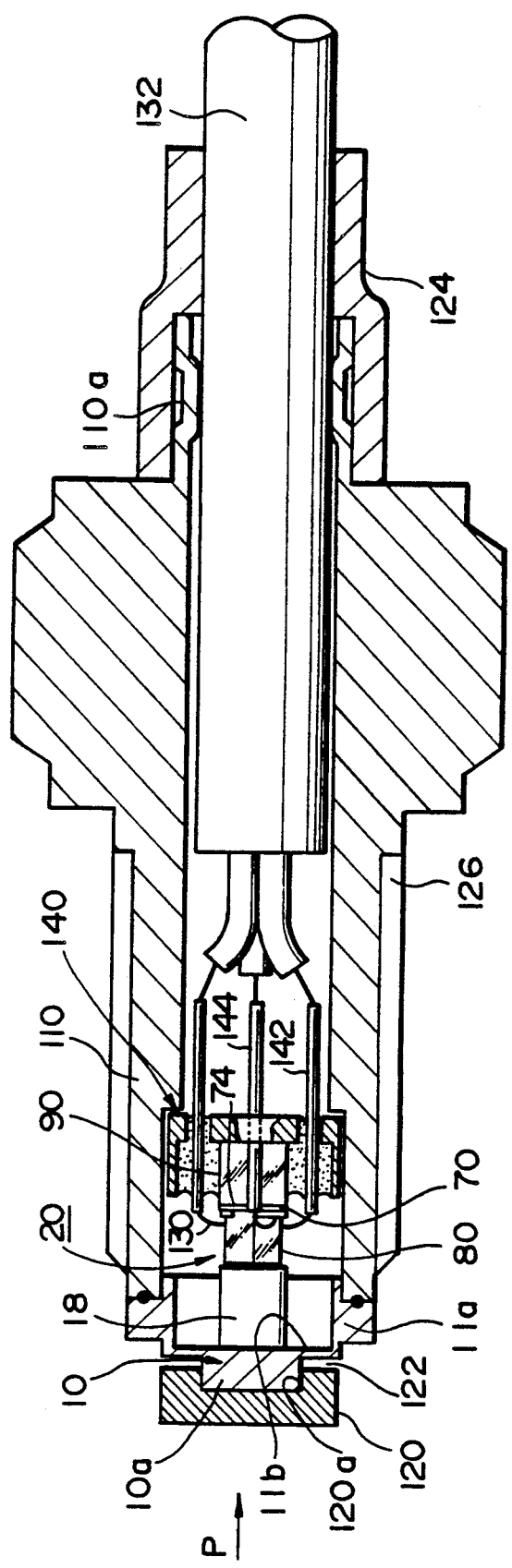
FIG. 16 is an explanatory view of an example of a preferred combustion pressure sensor to which the present invention is applied.

FIG. 16 shows a pressure sensor for high-temperature fluid of this embodiment. The same reference numerals are provided for the elements which are the same as those in the first and second embodiments, and explanation thereof will be omitted.

The pressure sensor is composed of a substantially cylindrical sensor case 110 and the diaphragm attached to the opening of the sensor case 110.

When high-temperature fluid acts on the surface of the diaphragm 10, the pressure P acts on the Si single crystal 70 through a pressure transmitting portion 18 composed of a thermally insulating material and the seat 80 as the compression force, whereby the measured voltage corresponding to the pressure P is output from the Si single crystal 70 through a lead wire 132.

When the pressure P of high-temperature and high-pressure fluid is measured by this pressure sensor, the surface 12 of the diaphragm 10 is exposed to the high-temperature and high-pressure fluid. In order to prevent the heat of the high-temperature and high-pressure fluid transferred to the diaphragm 10 from being transferred to the Si single crystal 70 through the sensor case 110, a material having a good thermal conductivity is used for the sensor case 110. It is further preferable that the heat is released from a groove 126 for a fixing screw of the sensor case 110 to a cylinder head portion (not shown).

The pressure sensor of this embodiment uses the first pressure detector as the pressure detector 20.

Figure 17A:
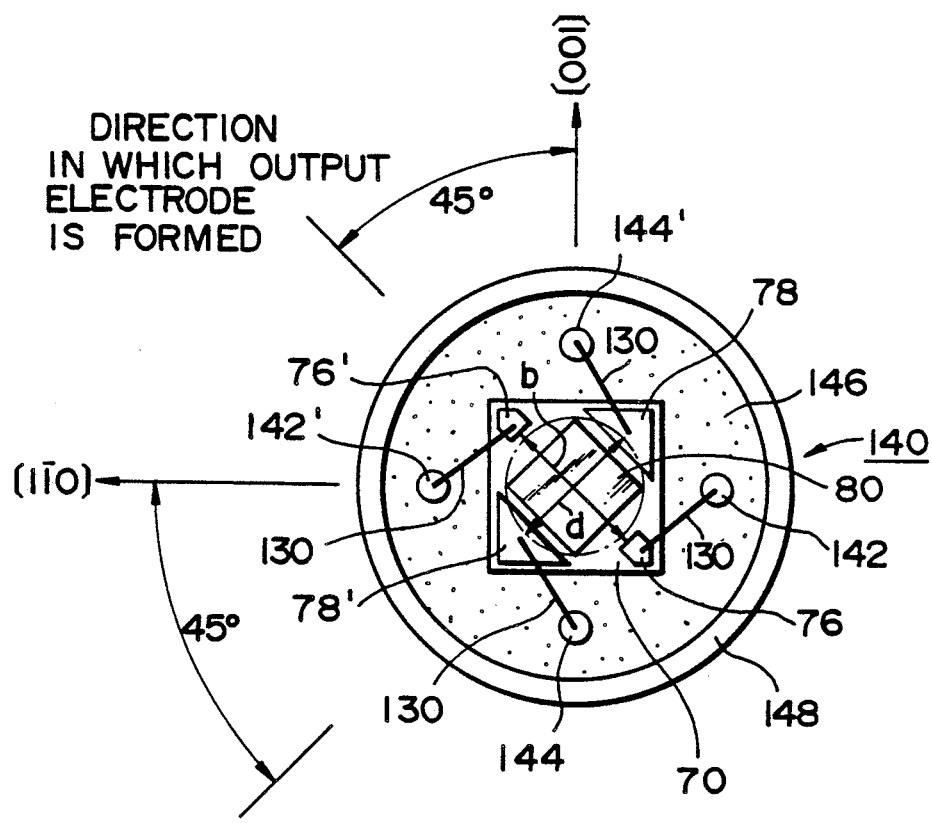
FIG. 17(A) is a plan view of the pressure detector and FIG. 17(B) a side elevational view thereof.
Figure 17B:
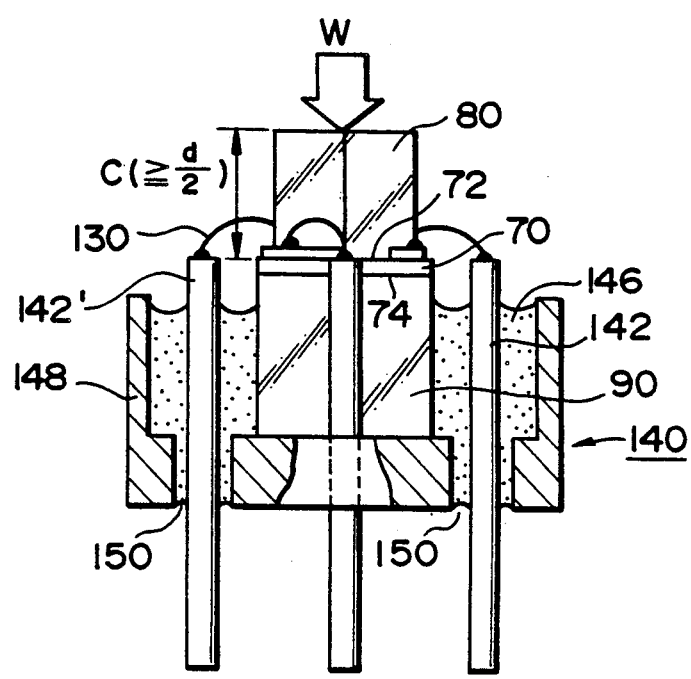

The pressure detector 20 has a stem 140 shown in FIG. 17. The stem 140 includes the support base 90 which is bonded to the other crystal face 74 of the Si single crystal 70 for supporting the Si single crystal 70, a plurality of input electrode terminals 144, 144' for applying a current from the outside to the input electrodes 78, 78', a plurality of output electrode terminals 142, 142' for taking the electric signals output from output electrodes 76, 76' to the outside, and holding means for integrally holding these electrode terminals 142, 142', 144 and 144' and the support base 90.

In the stem 140 in FIG. 17, these electrode terminals 142, 142', 144 and 144' are annually disposed around the support base 90 in such a manner as to be substantially symmetrical to each other. The stem 140 uses a substantially cylindrical ring 148 and sealing glass 146 as the holding means. Into the ring 148 with the upper end open, the support base 90 and the electrode terminals 142, 142', 144 and 144' are inserted and integrally fixed thereat by using the sealing glass 146.

One end of each of the electrode terminals 142, 142', 144 and 144' is substantially flush with the crystal face 72 of the Si single crystal 70 and is connected to the corresponding electrodes 76, 76', 78, 78' through a gold wire 130.

The other ends of the electrode terminals 142, 142', 144 and 144' are led to the outside through through holes 150 provided on the bottom surface of the ring 148 and are connected to the lead wire 132 shown in FIG. 16 so as to be electrically connected to an external measuring instrument through the lead wire 132.

In this way, in the pressure detector 20, the output electrode terminals 142, 142' and the input electrode terminals 144, 144' are integrally provided with the support base 90 as the stem 140. Accordingly, electrical connection is completed merely by connecting the electrodes 76, 76', 78 and 78' of the Si single crystal 70 bonded to the support base 90 with the electrode terminals 142, 142', 144 and 144', respectively, through the short lead wires 130 of, e.g., 10 mm long, thereby facilitating electrical connection.

Since electrical connection in this embodiment is dispensed with wiring of semiconductor strain gauges unlike in the related art, the electrical connection is performed with easiness and reliability without the need for special technique. In addition, since the electrical wiring is very short, the possibility of noise interfering with the wire as in the case of complicated wiring in the related art is precluded and the pressure detector 20 becomes highly reliable.

In FIG. 17, the ring and the sealing glass are used as the holding means, but they may be replaced by another means so long as it can integrally hold the electrode terminals 142, 142', 144 and 144' and the support base 90. For example, a ceramic package may be used.

As described above, this embodiment adopts a novel pressure detecting system in which the pressure of high-temperature fluid acting on the surface of the diaphragm is applied perpendicularly to the crystal face {110} of the Si single crystal as the compression force through the seat which serves as the transmitting means.

According to this embodiment, it is possible to accurately measure the pressure of high-temperature fluid applied without any deleterious influence of the adhesive or the strain generator on the characteristics unlike a conventional pressure sensor by effectively utilizing the piezoresistive effect of the Si single crystal.

In addition, according to this embodiment, the electric connection of the Si single crystal is facilitated by short conductors without leading around lead wires by providing a stem for integrally holding the support base which supports the Si single crystal and the input and output electrode terminals connected to the corresponding input and output electrodes of the Si single crystal by using a holding means. Consequently, it is possible to produce an inexpensive and highly reliable pressure sensor which is easily produced and is scarcely influenced by noise.

Concrete examples of a semiconductor pressure sensor of this embodiment will be explained in the following with reference to the following first to third examples.

First Example

A first example of a semiconductor pressure sensor will be first explained with reference to FIG. 16.

This pressure sensor is produced by inserting the flange portion 11a of the diaphragm 10 into the opening portion of the substantially cylindrical sensor case 110 and the fitted portions are bonded by projection welding over the entire periphery so as to prevent the combustion gas from entering the interior of the sensor case 110.

A block portion 120 is provided at the central portion of the surface of the diaphragm 10 so as to absorb the heat of the combustion gas in the vicinity of the diaphragm 10 and the heat transferred to the diaphragm 10 itself.

For effecting such heat absorption, the temperature of the block portion 120 must be lower than the temperature of the diaphragm 10. The block portion 120 is therefore be required to have a large specific heat and a large thermal conductivity. If the block portion 120 is too large, the number of natural oscillation of the diaphragm 10 is unfavorably lowered. Especially, when the pressure sensor in accordance with the present invention is used as a combustion pressure sensor, if the weight of the block portion 120 is increased and, hence, the intrinsic number of natural oscillation of the diaphragm is lowered, the measurable range of number of vibration is reduced, so that when the combustion pressure sensor is attached to a vigorously vibrating element such as an engine, it is difficult to detect a signal indicating knocking or the like.

The block portion 120 is therefore required to reduce the specific weight with respect to the diaphragm 10, and with the reduction in the specific weight, the detecting characteristic of the sensor is enhanced.

For this purpose, in this embodiment, the diaphragm 10 and the block portion 120 are provided separately from each other. A protrusion 10a provided in the vicinity of the central portion of the surface of a thin plate portion 11b of the diaphragm 10 is engaged with a recessed portion 120a provided at the central portion of the block portion 120, whereby the block portion 120 is secured to the central portion of the diaphragm 10.

This structure allows the diaphragm 10 and the block portion 120 to be produced from different materials. That is, it is possible to use a material having an excellent spring characteristic at a high temperature, e.g., SUS 430, and Inconel X720 for the diaphragm 10 and a material having a good thermal conductivity, e.g., an Al alloy for the block portion 120.

If the block portion 120 is made of an Al alloy, the mass becomes about ⅓ in comparison with a conventional block portion made of an Fe or Ni alloy. In other words, if an Al alloy is used for the block portion 120, it is possible to triple the heat capacity without substantially any change in the responsiveness and the acceleration sensitivity by tripling the volume of a conventional block portion.

In addition, if the block portion 120 is made of an Al alloy, the specific heat becomes about 2 times and the thermal conductivity about 3 times in comparison with a conventional block portion made of an Fe or Ni alloy.

Thus, according to this embodiment, it is possible to increase the specific heat of the block portion to about 2 times and the thermal conductivity thereof to about 3 times and to reduce the specific weight to about ⅓ in comparison with a conventional block portion by forming the diaphragm 10 from a material having an excellent spring characteristic at a high temperature such as SUS 430, and Inconel X720 and the block portion 120 from, for example, an Al alloy. In other words, if the block portion 120 of this embodiment and a conventional block portion which is integrally formed with the diaphragm have the same volume, about 18 times as large effect as that of the conventional one can be expected from the block portion 120 of this embodiment.

In this embodiment, the protrusion 10a is so designed as not to be enlarged toward the end and the recessed portion 120a is so designed that the inner wall is conformity with the protrusion 10a and is not enlarged toward the bottom. In this way, the production of the block portion 120 and the diaphragm 10 is facilitated by press molding, thereby enhancing the mass productivity of the pressure sensor and reducing the manufacturing cost.

When the block portion 120 is bonded to the surface of the diaphragm 10, substantially the entire surface of the diaphragm 10 is covered with the block portion 120 through a gap 122 as if by an umbrella. The size of the gap 122 can be controlled as desired by the dimensions of the protrusion 10a and the recessed portion 120a. In FIG. 16, the gap is substantially zero. In this way, the block portion 120 can absorb the heat of the combustion gas in the vicinity of the diaphragm immediately after it is generated.

The amount of heat transferred directly from the combustion gas to the diaphragm 10 is therefore greatly reduced and, as s result, the rise in the temperature of the diaphragm 10 is effectively suppressed and the creep and the like of the diaphragm can be reduced.

In the pressure sensor of this embodiment, the outer periphery of the pressure detector 20 is attached to the internal peripheral surface of the sensor case 110 through the stem 140.

The electrode terminals 142, 142', 144 and 144' are provided in the stem 140, as shown in detail in FIG. 17, and one end of each of these electrode terminals is electrically connected to the corresponding input or output electrode through the Au wire 130. The other end of each of these electrode terminals is connected to the lead wire 132, which is lead to the outside of the sensor case 110.

In the sensor of this embodiment, a caulking portion 110a for lead wire is provided at the other end of the pressure sensor in order to prevent the lead wire 132 from slipping off and to prevent the tensile strength applied to the lead wire 132 from being applied to the electrode terminals 142, 142', 144 and 144'. The caulking portion 110a of the sensor case 110 is covered with a case cover 124.

The groove 126 for a fixing screw is provided on the outer peripheral portion of the sensor case 110 at the one end on the diaphragm side, and the sensor case 110 is easily attached to the desired position by engaging the groove 126 with a groove provided on the inner peripheral portion of a predetermined mounting hole (not shown).

FIG. 17 shows the details of the pressure detector 20 used for the pressure sensor.

In this embodiment, the Si single crystal 70 is a p-type Si single crystal having an impurity density of $1 \times 10^{16}/cm^3$ which is in the range of $1 \times 10^{15}/cm^3$ to $1 \times 10^{21}/cm^3$ (a resistivity $\rho$ of about 1 $\Omega$cm), an area of 1.7 mm$^2$ and a thickness of 17 $\mu$m.

A pair of opposing output electrodes 76, 76' having a width of 0.1 mm are provided on the crystal face 72 of the Si single crystal 70 in the direction having an angle of 45 degrees with the direction of $<001>$ by the deposition of aluminum, as shown in FIG. 17(A). A pair of opposing input electrodes 78, 78' having a width of 0.9 mm are provided in the direction having an angle of 45 degrees with the direction of $<1\bar{1}0>$ by the deposition of aluminum.

The seat 80 is composed of crystallized glass 1 mm$^2$ in area and 1.1 mm in height. The support base 90 is composed of crystallized glass having a thermal expansion coefficient approximate to that of the Si single crystal 70 and so formed as to have an area of 1.7 mm$^2$ and a height of 3 mm.

The ring 148 is formed into a substantially cylindrical shape with one end open by using an Fe-Ni-Co alloy, and provided at the bottom portion with a plurality of through holes 150 for inserting electrode terminal therethrough.

Each of the electrode terminals 142, 142', 144 and 144' is formed into a narrow and long rod shape having a diameter of 0.5 mm, and is inserted into the stem 140 to be fixed thereto with one end a thereof being substantially flush with the crystal face 72 of the Si single crystal 70. A gold plated layer is provided on the one end a of each of the input electrode terminals 144, 144' and is connected to the corresponding input electrodes 78, 78' through the gold wire 130 having a diameter of 0.05 mm. Similarly, a gold plated layer is provided on the one end a of each of the output electrode terminals 142, 142' and is connected to the corresponding output electrodes 76, 76' through the gold wire 130 having a diameter of 0.05 mm.

The following experiment was carried out in order to prove that the pressure detector 20 obtained in this way can output a voltage $\Delta V$ sufficiently large for practical use from the output electrode 76, 76' and that the output voltage $\Delta V$ is scarcely influenced by change of temperature.

The current I was applied to the Si single crystal 70 in the range in which the consumption power did not exceed 30 mW and a compression force of 5 kg was applied to the Si single crystal 70 through the seat 80 so that the compression stress $\sigma_Z$ is 15 kg/mm$^2$, which is within the range of breaking strength that does not break the Si single crystal 70.

In this embodiment, the resistance between the pair of input electrodes provided on the Si single crystal 70, what is called input resistance was 800 $\Omega$ at room temperature. Therefore, a current I of 6 mA was applied from the input electrodes 78, 78' to the Si single crystal 70 so that the consumption power did not exceed 30 mW.

As a result, a voltage $\Delta V$ of about 110 mV was obtained at room temperature from the output electrodes 76, 76' of the Si single crystal 70. The rate of change in the measured voltage $\Delta V$ in the range of $-40°$ to 150° C. was 0.15%/° C. It was therefore confirmed that the pressure detector 20 of this embodiment can output a voltage $\Delta V$ sufficiently large for practical use and that the influence of change of temperature on the characteristics was very small.

The same test was carried out by using the Si single crystal 70 of 200 $\mu$m thick for the pressure detector 20 shown in FIG. 17. It is necessary to apply the current I of 21 mA from the input electrodes 78, 78' in order to prevent the consumption power from exceeding 30 mW. When the Si single crystal 70 having a thickness h of 200 $\mu$m was used, even if the current of 21 mA was applied from the input electrodes 78, 78', the voltage output from the pressure detector 20 was about 30 mV at most. It will be understood from this fact that the pressure detector 20 of this embodiment can produce the measured voltage $\Delta V$ sufficiently large for practical use.

Although a p-conduction type Si single crystal 70 having an impurity density of $1 \times 10^{16}/cm^3$ is used in this embodiment, the conduction type is not restricted to the p-type and the same effect is obtained by using an n-conduction type Si single crystal 70.

As described above, in the pressure detector 20 of this embodiment, it is possible to obtain a large measured voltage $\Delta V$ by reducing the thickness h of the Si single crystal 70. This effect becomes more prominent as the impurity density is increased toward $1 \times 10^{21/cm3}$ In the pressure detector shown in FIG. 17, the side of the seat 80 to which the compression force W is applied has a flat shape. Alternatively, a convex or concave surface may be provided in a part or over the entire surface on the side to which the compression force W is applied so that the compression force W applied from the pressing surface of the pressing plate acts substantially on the center of the seat 80.

Figure 18:
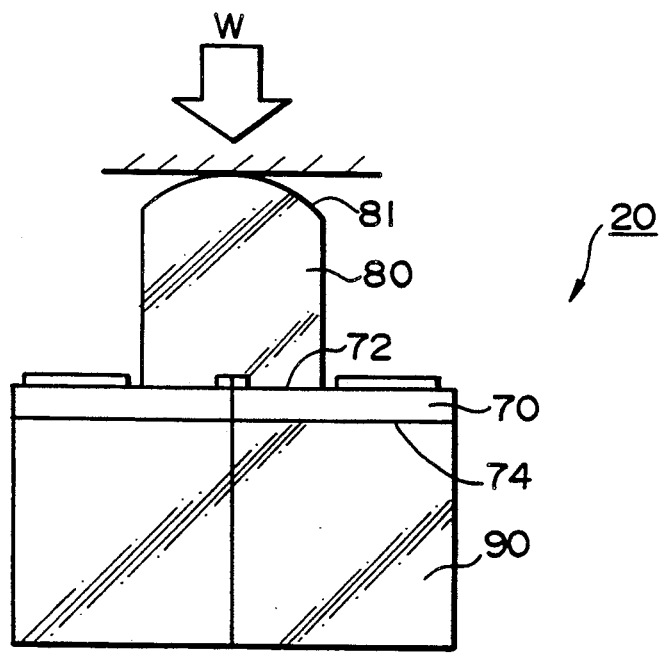
FIG. 18 is an explanatory view of a modification of the pressure detector shown in FIG. 17.

For example, as shown in FIG. 18, the compression force W may be applied to the outwardly curved surface 81 of the seat 80.

Although the pressure transmitting portion 18 composed of a thermally insulating material is used in order to prevent the heat transfer from the diaphragm 10 to which the pressure P is applied to the Si single crystal 70 in this embodiment, pressure can be measured without using the thermally insulating material by forming the seat 80 into a composite seat excellent in thermal insulating property.

More specifically, since one end of the seat 80 is bonded to the Si single crystal 70, the seat 80 is preferably composed of a material having a thermal expansion coefficient which is approximate to that of the Si single crystal 70. The other end of the seat 80 is in contact with the diaphragm 10. This portion of the seat is preferably made of a material having an excellent mechanical strength or thermal insulation property. Consequently, the portion of the seat 80 which is to be bonded to the Si single crystal 70 is preferably made of an electrically insulating material having a thermal expansion coefficient which is approximate to that of the Si single crystal 70 and the portion which is to be brought into contact with the diaphragm 10 is preferably made of a material more excellent in mechanical strength or thermal insulation property than the material for the bonding portion with the Si single crystal 70.

By forming the seat 80 itself as a composite seat consisting of a combination of two kinds of materials, as described above, in the case of measuring the pressure of high-temperature and high-pressure fluid such as combustion gas in the cylinder of an internal combustion engine, the heat transmitted to the diaphragm is alleviated by the seat 80 and does not act on the Si single crystal 70 as a high temperature. The Si single crystal 70 is therefore capable of outputting the voltage corresponding to the pressure P applied to the diaphragm 10 without being influenced by the ambient temperature.

At the portion at which the seat 80 comes into contact with the diaphragm 10, a compression force sometimes locally acts on the diaphragm 10 due to local contact according to the state of the bonded area. In this case, the seat 80 is sometimes plastically deformed or broken. However, by using the material having excellent mechanical strength for this portion, as described above, the seat 80 is not broken due to the local contact of the portion of the seat 80 bonded to the diaphragm 10, thereby enabling accurate measurement of the pressure P.

Various modifications of this example is possible in the scope of the present invention.

For example, as the pressure detector, the pressure sensor for high-temperature fluid can use the second pressure detector shown in FIG. 11 or the third pressure detector shown in FIG. 12 in place of the first pressure detector.

Second example

A second example of a semiconductor pressure sensor, which uses the second pressure detector, will now be explained.

As shown in FIG. 11, the second pressure detector 20 includes the Si semiconductor layer 102 so formed as to have a crystal face of (110) and having an area of 1.7 mm$^2$ and a thickness of 200 $\mu$m, the SiO$_2$ electrical insulation film 100 of 1 $\mu$m thick formed by heat treating the side surface side of the semiconductor layer 102 at a high temperature, and the Si single crystal 70 having a crystal face of (110) grown on the insulation film 100 to a thickness h of 1 $\mu$m by epitaxial growth. The crystal face 72 of the Si single crystal 70 is bonded to the seat 80 by electrostatic bonding, and the support base 90 is bonded to opposite side of the semiconductor layer 102 relative to the insulation film 100 by electrostatic bonding.

The Si single crystal 70 is a p-conduction type Si single crystal which contains thermally diffused boron at a density of $1\times10^{19}$/cm$^3$ (resistivity $\rho$ of about 0.01 $\Omega$cm), which is in the range of $1\times10^{15}$/cm$^3$ to $1\times10^{21}$/cm$^3$.

The series of steps of forming the insulation film 100 on the semiconductor layer 102, and adjusting the impurity density of the Si single crystal 70 to $1\times10^{19}$/cm$^3$ in accordance with IC manufacturing process technique are actually carried out in the wafer manufacturing stage. Thereafter, the wafer is cut by a dicer into an area of $1.7\times1.7$ mm$^2$, as shown in FIG. 7.

The current I was applied to the Si single crystal 70 of the thus-produced pressure detector in the range in which the consumption power did not exceed 30 mW at room temperature and a compression force of 15 kgW was also applied thereto in order to confirm the effect of reducing the thickness of the Si single crystal 70 and prove that the influence of change of temperature on the characteristics is small, in the same way as in the first example.

As a result, a voltage $\Delta V$ of about 25 mV was obtained at room temperature from the Si single crystal 70 and the rate of change in the measured voltage $\Delta V$ in the range of $-40°$ to $150°$ C. was $-0.23\%/°$ C.

It was therefore confirmed that the pressure detector 20 in this example can output a voltage $\Delta V$ sufficiently large for practical use and that the influence of change of temperature on the characteristics was very small.

In addition, in the pressure detector 20 in this example, since the Si single crystal 70 is provided on the main surface 100$a$ of the electrical insulation film 100, there is no current leakage even at a high temperature. Thus, the pressure detector is highly reliable.

Although a p-conduction type Si single crystal 70 is used in this example, the conduction type is not restricted to the p-type and the same effect is obtained by using an n-conduction type Si single crystal 70.

Although the Si single crystal 70 having a crystal face (110) is formed by epitaxial growth, the method is not restricted thereto and the Si single crystal 70 may be formed by using CVD or MBE growth together with a laser recrystallization technique.

Third example

A third example of a semiconductor pressure sensor, which uses the third pressure detector, will now be explained.

As shown in FIG. 12, the Si single crystal 70 is a p-conduction type Si single crystal 70 so formed as to have a crystal face of (110) and a thickness h of 200 $\mu$m. The Si single crystal 70 includes the p-conduction type conduction layer 104 for sensing compression force which has a thickness h of 2 $\mu$m and in which boron is thermally diffused at an impurity density of $5\times10^{18}$/cm$^3$ (resistivity $\rho$ of about $2\times10^{-2}$ $\Omega$cm), and the insulation layer 106 for electrically insulating the conduction layer 104 so that the conduction layer 104 functions at an accuracy of at least 1%.

The impurity density of the Si single crystal 70 is so controlled that the resistance of the passage of the conduction layer 104 in which a current flows from the input electrode 78 toward the opposite input electrode 78' is regulated to not more than 1/100 of the resistance of the passage of the insulation layer 106 in which a current flows in the same way.

The seat 80 is electrostatically bonded to the one crystal face 72 of the Si single crystal 70 and the support base 90 is electrostatically bonded to the other crystal face 74.

The input electrodes 78, 78' and the output electrodes 76, 76' are formed by deposition so as to be electrically connected to at least the conduction layer 104, thereby taking the measured voltage $\Delta V$ based on the piezoresistive effect of the conduction layer 104.

The current I was applied to the Si single crystal 70 of the thus-produced pressure detector 20 in the range in which the consumption power did not exceed 30 mW at room temperature in order to confirm the effect of reducing the thickness of the Si single crystal 70 and prove that the influence of change of temperature on the characteristics is small, in the same way as in the first and second examples.

As a result, it was confirmed that by reducing the thickness h of the conduction layer 104 to 2 $\mu$m, it was possible to obtain a voltage $\Delta V$ of about 10 times as large as a voltage obtained from the Si single crystal 70 having the conduction layer 104 of 200 μm thick. It was also confirmed that by controlling the impurity density of the conduction layer 104 so as to have a self sensitivity compensating function (disclosed in Japanese Patent Publication No. 58791/1982) for suppressing the fluctuation of the measured voltage ΔV with change of temperature (for example, in the case of p-conduction type Si single crystal, there are two impurity density regions, namely, about $5 \times 10^{18}/cm^3$ and about $2 \times 10^{20} cm^3$), the change in the measured voltage ΔV in the temperature range of −40° to 150° C. became substantially zero.

Although the Si single crystal 70 which serves both as the conduction layer 104 and the electrical insulation layer 106 is formed into a p-conduction type by using resistor layer isolation in this example, but it is also possible to produce a pressure detector having substantially the same effect by forming an n-conduction type Si single crystal 70 by using resistor layer isolation.

If the Si single crystal 70 which also serves as the insulation layer 106 in this example is provided with intrinsic characteristics having a small amount of carriers with donors and acceptors neutralized, the conduction layer 104 may be either of a p-conduction type or an n-conduction type.

It makes no difference that the conduction layer 104 and the electric insulation layer 106 are formed by p-n junction isolation. However, as well known, in the case of using p-n junction isolation, the output electrodes 76, 76' and the input electrodes 78, 78' must be electrically connected only to the conduction layer 104 and the electrical isolation function is substantially restricted to a temperature range of about 150° C.

Fourth Embodiment

A further embodiment of the present invention which is applied to a pressure sensor for high-temperature fluid will be explained.

Figure 19:
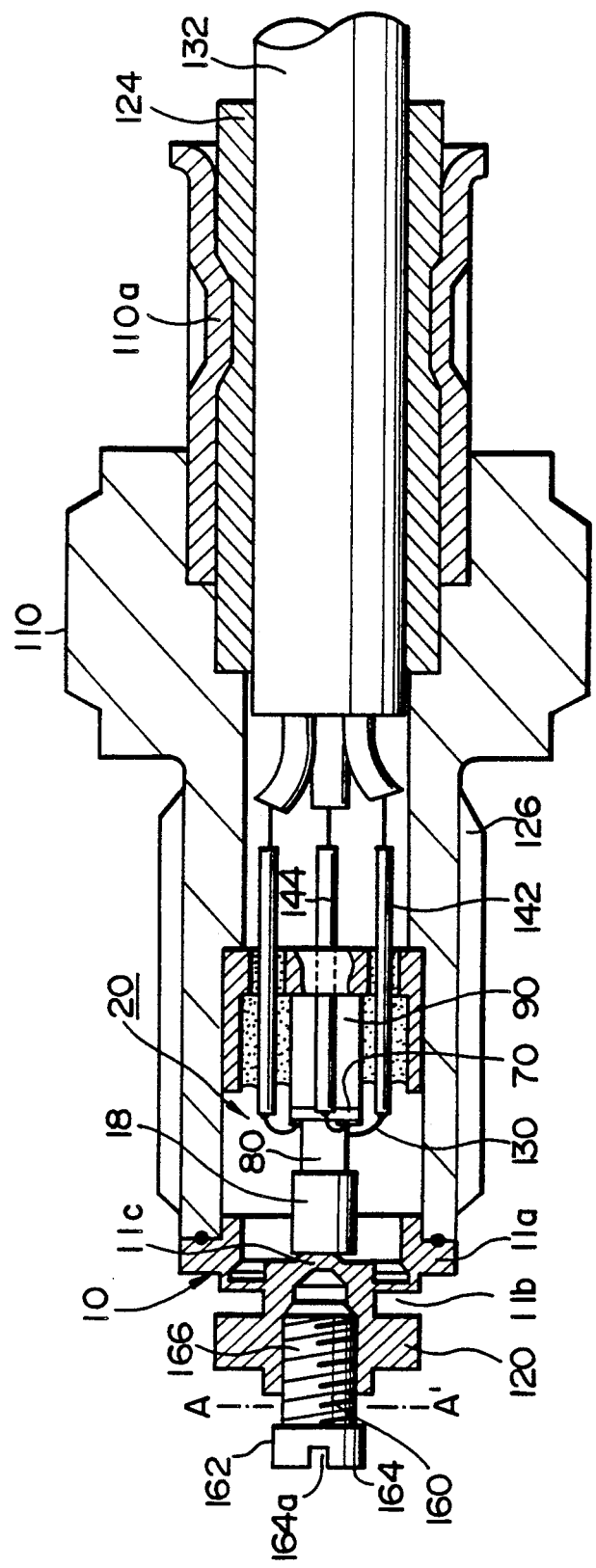
FIG. 19 is an explanatory view of another example of a preferred combustion pressure sensor to which the present invention is applied.

FIG. 19 shows a pressure sensor of this embodiment. The same reference numerals are provided for the elements which are the same as those in the third embodiment, and explanation thereof will be omitted.

This embodiment is characterized in that a threaded hole 160 is provided on the surface of the thin plate portion 11b of the diaphragm 10 in the direction of application of pressure, and an adjust screw 162 is engaged with the threaded hole 160 so as to deform the thin plate portion 11b in the direction of application of pressure, thereby applying a desired preload to the pressure detector 20.

The threaded hole 160 is provided from the block portion 120 toward the central portion of the thin plate portion 11b.

The adjust screw 162 is composed of a head portion 164 provided with a groove 164a which engages the tip of a driver and a screw portion 166 which engages the threaded hole 160. The tip of the screw portion 166 is formed into a cone shape so that the central portion of the tip effectively presses the center 11c of the surface of the thin plate portion 11b, thereby deforming the thin plate portion 11b.

It is necessary that the diaphragm 10 is so formed that the thin plate portion 11b is deformed in the right direction seen in FIG. 19 by the pressing force of the adjust screw 162. It is also necessary that the threaded hole 160 is so formed as not to penetrate to the back side of the thin plate portion 11b.

In the case of applying a preload to the pressure detector 20 by using the thus-formed adjust screw 162, the adjust screw 162 is first tightened while measuring the output of the pressure detector 20, whereby the tip of the adjust screw 162 is pressed against the center 11c of the thin plate portion 11b of the diaphragm 10. The center 11c of the thin plate portion 11b is deformed in the right direction seen in FIG. 19, and a preload is applied to the pressure detector 20 through the pressure transmitting portion 18 made of a thermally insulating material.

At this time, an electric signal corresponding to the preload is output from the pressure detector 20 and the adjuster sets the preload value as follows while seeing the electric signal.

Each part of a pressure sensor generally has a predetermined dimensional error, and an assembly error is produced in assembling each part. For example, in the case of projection welding the diaphragm 10 and the sensor case 110 for sealing, the diaphragm 10 is deformed by the amount corresponding to the height (about 0.2 mm) of the projection of the weld. Therefore, if the diaphragm 10 is brought into contact with the pressure sensor 20 secured to the sensor case 110 during the welding for assembling the pressure sensor, the impact force is applied to the pressure sensor 20, thereby involving the danger of breaking the pressure sensor 20. It is therefore desirable to gently apply a preload to the pressure detector 20 after the assembly, in particular, after the projection welding of the diaphragm 10 and the sensor case 110.

At this time, it is necessary to set the preload value at a value of not less than a predetermined lower limit so as to prevent the expansion or contraction of the diaphragm 10 and the sensor case 110 due to heat from obstructing the application of a pressure from the diaphragm 10 to the pressure detector 20 and to enable the accurate detection of the negative load and the like acting on the surface of the diaphragm 10.

It is also necessary to set the preload value at a value of not more than a predetermined upper limit so as not to produce a fatigue failure on the pressure detector 20 when a pressure is measured repeatedly by using the pressure sensor.

For this purpose, in the pressure sensor of this embodiment, the preload value is adjusted so as to exist between the lower limit and the upper limit by adjusting the adjust screw 162.

When the preload has been adjusted, the adjust screw 162 is cut away at the position indicated by the broken line A—A', thereby reducing the additive mass of the diaphragm 10 and enhance the resistance to vibration.

The adjust screw 162 is engaged with the threaded hole 160 provided in the diaphragm 10. Therefore, when the mass of the adjust screw 162 is increased, the number of natural oscillation of the diaphragm 10 and, hence, the resistance to vibration is lowered, so that when the combustion pressure sensor is attached to a vigorously vibrating element such as an engine, the accuracy of detecting pressure is greatly lowered. To prevent this, in this embodiment, when preloading by the adjust screw 162 has been finished, the head portion 164 of the adjust screw 162 is cut away, thereby preventing the resistance to vibration of the combustion pressure sensor from lowering.

In this embodiment, the preload is adjusted by tightening the adjust screw 162 while seeing the measured value output from the Si single crystal 70.

Figure 20:
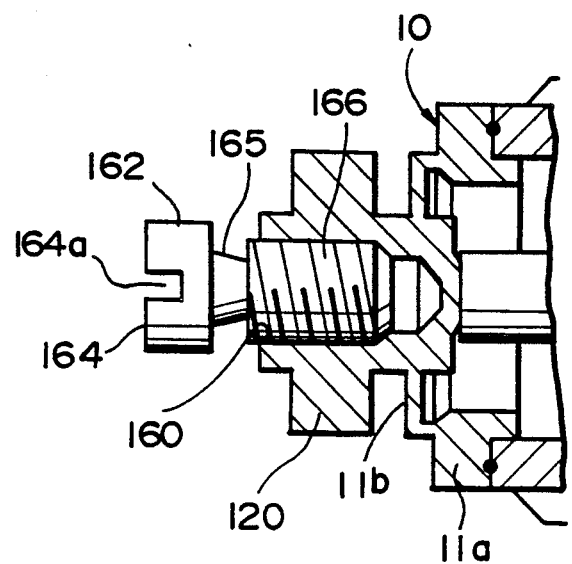
FIG. 20 is an explanatory view of a modification of the combustion pressure sensor shown in FIG. 19.

Alternatively, the adjust screw 162 may be provided with a narrow portion 165 having a predetermined screw breaking strength, as shown in FIG. 20.

When the adjust screw 162 is tightened into the threaded hole 160, the head portion 164 is cut away from the narrow portion 165 at the point at which the tightening force has exceeded the screw bearing strength, whereby the preload applied from the screw portion 166 to the Si single crystal 70 is adjusted to a constant value.

In this way, according to the sensor of this embodiment, it is possible to adjust the preload value applied to the pressure detector with easiness and security, thereby facilitating the mass production of this kind of sensor.

As described above, according to this embodiment, it is possible to accurately measure a pressure ranging from a negative pressure to a positive pressure without being influenced by a change in the ambient temperature by applying a desired preload easily to the pressure detector 20 through the diaphragm 10. Thus, it is possible to obtain a pressure sensor which is capable of accurately measuring the pressure of, especially, high-temperature fluid.

An Si single crystal having a crystal face of (110) is used for the pressure detector in these embodiments, but an Si single crystal having a crystal face of {110} which is equivalent to the crystal face (110), as shown in Table 1, may be used for the pressure detector.

Method of producing pressure detector

Figure 4A:
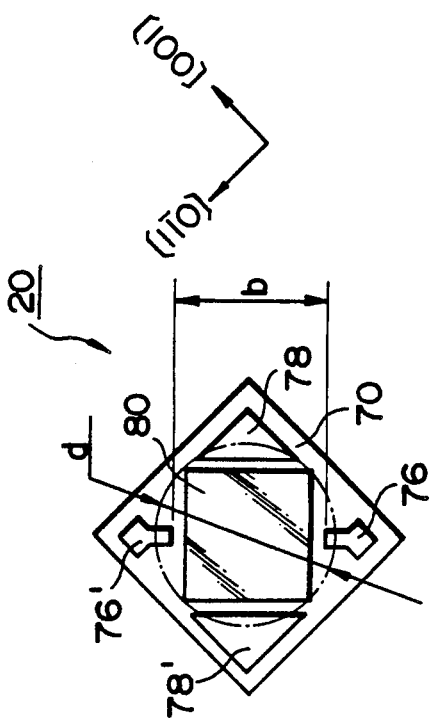
FIG. 4(A) is a plan view and FIG. 4(B) a side elevational view thereof.
Figure 4B:
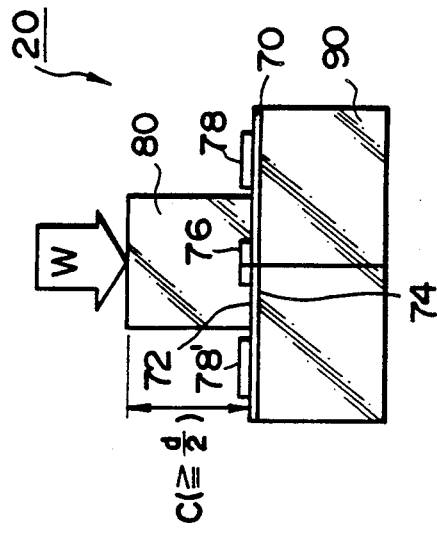

A method of producing a pressure detector used in the present invention will now be explained with reference to a method of producing the pressure detector shown in FIG. 4.

The Si single crystal 70 is formed as a p-type Si single crystal having a resistivity of 10 Ωcm, an area of 1.7 mm$^2$ and a thickness of 0.2 mm. A pair of opposing output electrodes 76, 76' are provided on the one crystal face 72 of the Si single crystal 70 in the direction having an angle of 45 degrees with the direction of [001] by the deposition of aluminum, and a pair of opposing input electrodes 78, 78' are provided in the direction having an angle of 45 degrees with the direction of [110] by the deposition of aluminum.

The support base 90 is composed of crystallized glass having a thermal expansion coefficient approximate to that of the Si single crystal 70 and having an area of 1.7 mm$^2$ and a thickness of 1 mm. The seat 80 is composed of cubic crystallized glass 1 mm$^2$ in area and 1 mm in thickness.

Figure 21:
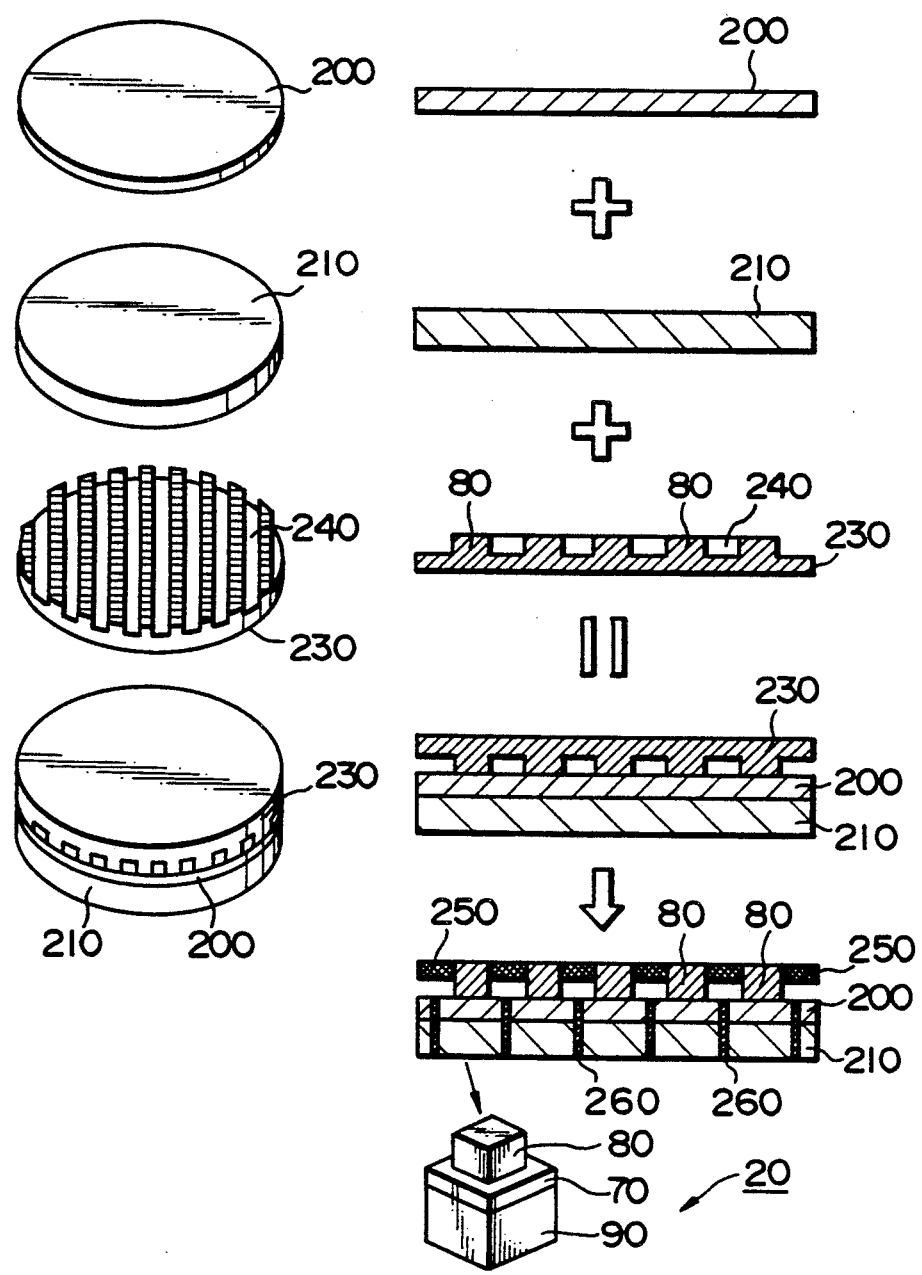
FIG. 21 is an explanatory view of an example of a method of manufacturing the pressure detector shown in FIG. 4.

FIG. 21 shows a preferred embodiment of a method of producing the pressure detector 20.

In this embodiment, an Si single crystal wafer 200 is so formed as to have a crystal face (110) as the surface to which the compression force is applied. The output electrodes 76, 76' and the input electrodes 78, 78' are provided on the one crystal face 72 of the Si single crystal wafer 200 by the deposition of aluminum in accordance with a predetermined pattern, as shown in FIG. 22.

On one surface of a seat wafer 230, a plurality of seats 80 are provided in such a manner as to be surrounded by matrix grooves 240 of a predetermined pattern. The width of the matrix groove 240 is set at $w_2$.

The seat wafer 230 is positioned on the crystal face 72 of the Si single crystal water 200 by a positioning jig (not shown) and electrostatically bonded with the Si single crystal wafer 200.

Figure 22:
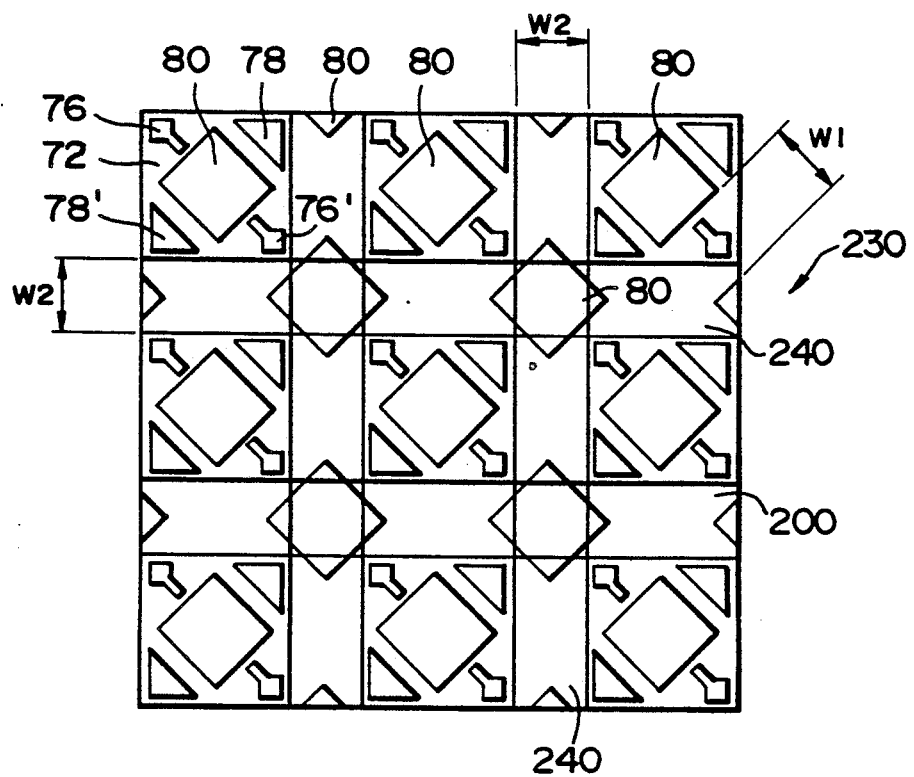
FIG. 22 is an explanatory view of a method of positioning the Si single crystal wafers and the transmission portion wafers in manufacturing a pressure detector by a manufacturing method in accordance with the present invention.

FIG. 22 shows the seat wafer 230 positioned on the crystal face 72 of the Si single crystal wafer 200. In the seat wafer 230 shown in FIG. 22, the seats 80 surrounded by the matrix grooves 240 are only shown.

In this embodiment, plural pairs of output electrodes 76, 76' and input electrodes 78, 78' are provided on the crystal face 72 of the Si single crystal wafer 200 in accordance with a predetermined pattern.

The seat wafer 230 is positioned on the crystal face 72 of the Si single crystal wafer 200 such that each seat 80 is located at the center of the corresponding electrodes 76, 76', 78, 78' and electrostatically bonded with the Si single crystal wafer 200.

After positioning a support base wafer 210 and the seat wafer 230 on both sides of the Si single crystal wafer 200 and electrostatically bonding them in this way, the seat wafer 230 is diced along the matrix grooves 240 at a width of $w_1$ and a seal holding portion 250 for the seats 80 is removed, as shown in FIG. 21.

In this way, a plurality of seat wafers 230 are electrostatically bonded in matrix to the crystal face 72 of the Si single crystal wafer 200.

In this state, the electrostatically bonded Si single crystal wafer 200 and the support base wafer 210 are diced along the centers 260 of the dicing grooves (matrix grooves 240), thereby cutting out a plurality of pressure detectors 20.

According to the manufacturing method of this embodiment, the pressure detectors 20 are produced by a simple process comprising the steps of positioning the three wafers 200, 210 and 230 with each other, electrostatically bonding them, dicing the seat wafer 230 along the matrix grooves 240, and dicing the Si single crystal wafer 200 and the support base wafer 210 along the dicing grooves.

Furthermore, according to the present invention, since it is possible to position the parts 70, 80 and 90 in each wafer, accurate positioning is realized, thereby enabling the production of a pressure detector excellent in electric characteristics. Especially, according to this embodiment, it is possible to produce pressure detectors having uniform electric characteristics in the unit of a lot. Thus, the method of the present invention is suitable for mass-producing small devices such as pressure detectors.

The manufacturing method of the pressure detector is not restricted to this embodiment, but various modifications are possible.

For example, in this embodiment, the Si single crystal 70 and the seat 80 are electrostatically bonded directly with each other and the Si single crystal 70 and the support base 90 are also electrostatically bonded directly with each other, but various laminates may be provided on the bonded surfaces, if necessary.

For example, it is possible to subsequently laminate a semiconductor layer and an insulation film on the one crystal face 74 of the Si single crystal 70 and electrostatically bond the Si single crystal 70 with the support base 90 through these laminates. In this case, these laminates are formed on the crystal face 74 of the Si single crystal wafer 200 at the stage of producing a wafer.

In this embodiment, an Si single crystal wafer having a crystal face of (110) is used, but the present invention is not restricted thereto and an Si single crystal wafer having a crystal face equivalent to the crystal face (110), such as ($\bar{1}10$), ($\bar{1}10$) and ($\bar{1}\bar{1}0$), may be used instead.

An Si single crystal having a crystal face of (110) is used for these pressure detectors, but an Si single crystal having a crystal face of (110) which is equivalent to the crystal face (110), as shown in Table 1, may be used instead.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A semiconductor pressure transducer comprising:
   a diaphragm; and
   a pressure detector;
   said pressure detector including:
   an Si single crystal which is so formed as to have a crystal face of {110} as the surface to which a compression force is applied, and which is attached to said pressure detector such that said crystal face is parallel to said diaphragm;
   a first pair of opposing electrodes provided on said Si single crystal in the direction having an angle of 45 degrees with the direction of <001> on said crystal face of {110} and a second pair of opposing electrodes provided on said Si single crystal in the direction having an angle of 45 degrees with the direction of <110> of said Si single crystal, either of said first or second pair of electrodes serving as output electrodes and the other pair serving as input electrodes;
   a composite seat with one end portion and the other end portion being made of different materials from each other, said one end portion being bonded to said crystal face of {110} of said Si single crystal and said other end portion being in contact with said diaphragm so as to transmit the pressure applied to said diaphragm perpendicularly to said crystal face of said Si single crystal as a compression force; and
   a support base which is bonded to the opposite surface of said Si single crystal relative to the surface to which said seat is bonded and which supports said Si single crystal;
   said semiconductor pressure transducer converting the pressure applied to said diaphragm into a compression force which acts perpendicularly to said crystal face of said Si single crystal and outputting the voltage corresponding to said compression force from said output electrodes.

2. A semiconductor pressure transducer according to claim 1, wherein said composite seat comprises said one end portion made of a material electrically insulated from said Si single crystal and having a thermal expansion coefficient approximate to that of said Si single crystal, and said other end portion made of a material having a more excellent mechanical strength or thermal insulation property than the material used for the former portion.

3. A semiconductor pressure transducer according to claim 1, wherein said Si single crystal has a rectangular crystal face and uniform thickness and impurity density.

4. A semiconductor pressure transducer according to claim 1, said seat has a height of not less than d/2 which is assumed to be the radius of the circumcircle of the bonding area at which said Si single crystal and said seat are bonded with each other.

5. A semiconductor pressure transducer according to claim 1, wherein said Si single crystal is so controlled as to have an impurity density in the range of $1 \times 10^{15}/cm^3$ to $1 \times 10^{21}/cm^3$ an a thickness of not more than 50 μm.

6. A semiconductor pressure transducer according to claim 5, wherein said pressure detector includes a stem,
   said stem including
   said support base,
   a plurality of output electrode terminals for taking out electric signals output from said output electrodes to the outside,
   a plurality of input electrode terminals for applying a current from the outside to said input electrodes, and
   a holding means for integrally holding said input electrode terminals, said output electrode terminals and said support base.

7. A semiconductor pressure transducer according to claim 1, wherein said pressure detector includes a semiconductor layer so formed as to have a crystal face of {110} which is covered with an insulation film,
   said Si single crystal is grown on said insulation film of said semiconductor layer so as to have a crystal face of (110) as the surface to which a compression force is applied, an impurity density controlled in the range of $1 \times 10^{15}/cm^3$ to $1 \times 10^{21}/cm^3$ and a thickness of not more than 50 μm,
   said electrodes and said seat are provided on said crystal face of (110) on said Si single crystal, and
   said support base is bonded to the opposite surface of said semiconductor layer relative to the surface on which said insulation film is formed.

8. A semiconductor pressure transducer according to claim 7, wherein said pressure detector includes a stem,
   said stem including
   said support base,
   a plurality of output electrode terminals for taking out electric signals output from said output electrodes to the outside,
   a plurality of input electrode terminals for applying a current from the outside to said input electrodes, and
   a holding means for integrally holding said input electrode terminals, said output electrode terminals and said support base.

9. A semiconductor pressure transducer according to claim 1, wherein said Si single crystal of said pressure detector includes a conduction layer so formed as to have a crystal face of {110} as the surface to which a compression force is applied and an impurity density controlled in the range of $1 \times 10^{15}/cm^3$ to $1 \times 10^{21}/cm^3$, and an electrical insulation layer provided adjacent to said conduction layer,
   said first pair of electrodes are provided on said conduction layer in the direction having an angle of 45 degrees with the direction of <001> of said Si single crystal and a second pair of electrodes are provided on said conduction layer in the direction having an angle of 45 degrees with the direction of <110> of said Si single crystal,
   said seat is bonded to said crystal face of {110} of said Si single conduction layer so as to transmit said compression force perpendicularly to said crystal face; and
   said support base is bonded to the opposite surface of said electrically insulation layer relative to the surface to which said conduction layer is bonded.

10. A semiconductor pressure transducer according to claim 9, wherein said pressure detector includes a stem,
   said stem including
   said support base,
   a plurality of output electrode terminals for taking out electric signals output from said output electrodes to the outside,
   a plurality of input electrode terminals for applying a current from the outside to said input electrodes, and
   a holding means for integrally holding said input electrode terminals, said output electrode terminals and said support base.

11. A semiconductor pressure transducer according to claim 1, wherein said pressure detector includes a stem,
   said stem including
   said support base,
   a plurality of output electrode terminals for taking out electric signals output from said output electrodes to the outside,
   a plurality of input electrode terminals for applying a current from the outside to said input electrodes, and
   a holding means for integrally holding said input electrode terminals, said output electrode terminals and said support base.

12. A semiconductor pressure transducer according to claim 11, wherein said stem further includes a ring for integrally securing said input electrode terminals, said output electrode terminals and said support base thereto by using sealing glass.

13. A semiconductor pressure transducer according to claim 1, wherein said diaphragm is provided on the surface thereof with a threaded hole in the direction in which pressure is applied, and an adjust screw is engaged with said threaded hole so as to deform said diaphragm in the direction in which pressure is applied, thereby applying a preload to said Si single crystal.

14. A semiconductor pressure transducer according to claim 13, wherein said adjust screw is provided with a narrow portion having a predetermined screw breaking strength.

15. A semiconductor pressure transducer according to claim 1, wherein said diaphragm is provided in the vicinity of the central portion of the surface thereof with a protrusion which is engaged with a recessed portion provided at a block portion having a large heat capacity so as to secure said block portion to the surface of said diaphragm.

16. A semiconductor pressure transducer according to claim 15, wherein said diaphragm is formed from a material exhibiting a good spring characteristic at a high temperature, and
   said block portion is formed from a material having large specific heat and heat conductivity.

17. In a semiconductor pressure transducer for high-temperature fluid for transmitting the pressure of high-temperature fluid applied to the surface of a diaphragm to a pressure detector as a compression force and measuring said pressure of said high-temperature fluid on the basis of an electric signal output from said pressure detector, the improvement comprising:
   said pressure detector including
   an Si single crystal which is so formed as to have a crystal face of $\theta 110\lambda$ as the surface to which a compression force is applied, and which is attached to said pressure detector such that said crystal face is parallel to said diaphragm,
   a first pair of opposing electrodes provided on said Si single crystal in the direction having an angle of 45 degrees with the direction of $<001>$ on said crystal face of $\theta 110\lambda$ and a second pair of opposing electrodes provided on said Si single crystal in the direction having an angle of 45 degrees with the direction of $<110>$ of said Si single crystal, either of said first or second pair of electrodes serving as output electrodes and the other pair serving as input electrodes,
   a composite seat with one end thereof bonded to said crystal face of $\theta 110\lambda$ of said Si single crystal and the other end thereof in contact with said diaphragm so as to transmit the pressure applied to said diaphragm perpendicularly to said crystal face of said Si single crystal as a compression force, and
   a stem which is bonded to the opposite surface of said Si single crystal relative to the surface to which said seat is bonded;
   said stem including
   a support base which is bonded to the opposite surface of said Si single crystal relative to the surface to which said seat is bonded and which supports said Si single crystal,
   a plurality of output electrode terminals for taking out electric signals output from said output electrodes to the outside,
   a plurality of input electrode terminals for applying a current from the outside to said input electrodes, and
   a holding means for integrally holding said input electrode terminals, said output electrode terminals and said support base;
   said semiconductor pressure transducer applying a compression force perpendicularly to said crystal face of said Si single crystal while applying a current from said input electrode terminals to said Si single crystal and outputting from said output electrode terminals the voltage corresponding to the pressure of said high-temperature fluid which acts on the surface of said diaphragm.

18. A semiconductor pressure transducer for high-temperature fluid according to claim 17, wherein said diaphragm is provided in the vicinity of the central portion of the surface thereof with a protrusion which is engaged with a recessed portion provided at a block portion having a large heat capacity so as to secure said block portion to the surface of said diaphragm.

19. A semiconductor pressure transducer for high-temperature fluid according to claim 18, wherein said Si single crystal is so formed as to have an impurity density controlled in the range of $1 \times 10^{15}/cm^3$ to $1 \times 10^{21}/cm^3$ and a thickness of not more than 50 $\mu$m.

20. A semiconductor pressure transducer for high-temperature fluid according to claim 17, wherein said diaphragm is provided on the surface thereof with a threaded hole in the direction in which pressure is applied, and an adjust screw is engaged with said threaded hole so as to deform said diaphragm in the direction in which pressure is applied, thereby adjusting the compression force applied in advance to said pressure detector.

21. A semiconductor pressure transducer for high-temperature fluid according to claim 20, wherein said Si single crystal is so formed as to have an impurity density controlled in the range of $1 \times 10^{15}cm^3$ to $1 \times 10^{21}/cm^3$ and a thickness of not more than 50 $\mu$m.

22. A semiconductor pressure transducer for high-temperature fluid according to claim 17, wherein said Si single crystal is so formed as to have an impurity density controlled in the range of $1 \times 10^{15}/cm^3$ to $1 \times 10^{21}/cm^3$ and a thickness of not more than 50 $\mu$m.

* * * * *